(12) United States Patent
Huang et al.

(10) Patent No.: US 12,382,448 B2
(45) Date of Patent: Aug. 5, 2025

(54) RESOURCE ELEMENT MAPPING FOR HIGH AND LOW PRIORITY HARQ-ACK/NACK AND CHANNEL STATE INFORMATION ON A PHYSICAL UPLINK SHARED CHANNEL

(71) Applicant: QUALCOMM Incorporated, San Diego, CA (US)

(72) Inventors: Yi Huang, San Diego, CA (US); Wanshi Chen, San Diego, CA (US); Peter Gaal, San Diego, CA (US); Wei Yang, San Diego, CA (US); Kianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 615 days.

(21) Appl. No.: 17/740,261

(22) Filed: May 9, 2022

(65) Prior Publication Data
US 2022/0369336 A1 Nov. 17, 2022

Related U.S. Application Data

(60) Provisional application No. 63/187,287, filed on May 11, 2021.

(51) Int. Cl.
*H04W 72/04* (2023.01)
*H04L 1/00* (2006.01)
(Continued)

(52) U.S. Cl.
CPC ....... *H04W 72/1268* (2013.01); *H04L 1/0008* (2013.01); *H04L 1/1812* (2013.01); *H04L 5/0055* (2013.01); *H04W 72/569* (2023.01)

(58) Field of Classification Search
None
See application file for complete search history.

(56) References Cited

U.S. PATENT DOCUMENTS

2024/0187141 A1* 6/2024 Ying ................ H04L 1/1854
2024/0306154 A1* 9/2024 Wang ............... H04W 72/21

OTHER PUBLICATIONS

International Search Report and Written Opinion—PCT/US2022/028604—ISA/EPO—Aug. 9, 2022.
(Continued)

*Primary Examiner* — Willie J Daniel, Jr.
(74) *Attorney, Agent, or Firm* — Guang Y. Zhang; Loza & Loza LLP

(57) ABSTRACT

A user equipment maps a high priority hybrid automatic repeat request-acknowledgment/negative acknowledgment (HARQ-ACK/NACK) information to one or more resource elements (REs), and maps one or more of a low priority HARQ-ACK/NACK information, channel state information (CSI), or uplink-shared channel (UL-SCH) data to REs while rate matching around the mapped high priority HARQ-ACK/NACK REs. A network entity receives an uplink transmission, including high and low priority HARQ-ACK/NACK information, CSI, and UL-SCH data mapped to high and low priority HARQ-ACK/NACK REs, CSI REs, and UL-SCH REs, respectively. The low priority HARQ-ACK/NACK REs, the CSI REs, and the UL-SCH REs are rate matched around the high priority HARQ-ACK/N ACK REs. The network entity demaps and decodes the REs of the high and low priority HARQ-ACK/NACK, the CSI, and UL-SCH to obtain the high and low priority HARQ-ACK/NACK information, CSI, and UL-SCH data.

30 Claims, 21 Drawing Sheets

(51) Int. Cl.
  *H04L 1/1812* (2023.01)
  *H04L 5/00* (2006.01)
  *H04W 72/1268* (2023.01)
  *H04W 72/566* (2023.01)

(56) References Cited

OTHER PUBLICATIONS

Qualcomm Incorporated: "Intra-UE Multiplexing and Prioritization for IOT and URLLC", 3GPP Draft, 3GPP TSG RAN WG1 #1 04-e, R1-2101462, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), XP051971627, 22 Pages.

* cited by examiner

- 602 Reserved RE
- 604 CSI-1 RE
- 608 CSI-2 RE
- 609 CSI-2 RE (mapped on reserved RE)
- 611 UL-SCH RE
- 613 HARQ-ACK/NACK RE (Punctures CSI-2 in reserved RE)
- 615 HARQ-ACK/NACK RE (Punctures UL-SCH data in reserved RE)

RESOURCE ELEMENT MAPPING FOR HIGH AND LOW PRIORITY HARQ-ACK/NACK AND CHANNEL STATE INFORMATION ON A PHYSICAL UPLINK SHARED CHANNEL

CROSS-REFERENCE TO RELATED APPLICATIONS

This application for patent claims priority to and the benefit of provisional patent application No. 63/187,287 entitled "Resource Element Mapping for High and Low Performance HARQ-ACK and Channel State Information on a Physical Uplink Shared Channel" filed in the United States Patent and Trademark Office on May 11, 2021, the entire content of which is incorporated herein by reference as if fully set forth below in its entirety and for all applicable purposes.

TECHNICAL FIELD

The technology discussed below relates generally to communication at a user equipment and/or at a network entity and, more particularly, to resource element (RE) mapping for high and low priority hybrid automatic repeat request-acknowledgment/negative acknowledgment (HARQ-ACK/NACK) messages and channel state or status information (CSI), as well as uplink-shared channel (UL-SCH) data on a physical uplink shared channel (PUSCH).

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a cell via a network node or entity, which may be implemented by a base station or gNodeB (gNB), for example.

A user equipment (UE) may provide uplink control information (UCI) to a network entity such as a gNodeB (gNB), where the UCI may be carried by either a physical uplink control channel (PUCCH) or a physical uplink shared channel (PUSCH). The UCI includes HARQ (Hybrid Automatic Repeat Request) feedback (e.g., an acknowledgment (ACK) or negative acknowledgment (NACK) feedback), channel state information (CSI), and scheduling request(s) (SR). In the case of transmission on the PUSCH, the UCI messages are first encoded and then multiplexed by mapping on the PUSCH. Additionally, it is noted that in 5G NR systems, a CSI report consists of two parts: (1) CSI part 1 (referred to herein as CSI-1) and (2) a CSI part 2 (referred to herein as CSI-2). Further, in 5G NR systems, the HARQ-ACK/NACK may be divided between high priority and low priority transmissions where a high priority HARQ-ACK/NACK and a low priority HARQ-ACK/NACK may be sent by the UE.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method of wireless communication at a user equipment (UE) is disclosed. The method of wireless communication can include: mapping a high priority hybrid automatic repeat request-acknowledgment/negative acknowledgment (HARQ-ACK/NACK) information to one or more resource elements (REs) in an uplink transmission; and mapping one or more of a low priority HARQ-ACK/NACK information, channel state information (CSI), or uplink-shared channel (UL-SCH) data to REs in the uplink transmission, including mapping to rate match around the mapped one or more high priority HARQ-ACK/NACK REs in the uplink transmission.

In some examples, a user equipment (UE) that includes a transceiver, a memory, and a processor communicatively coupled to the transceiver and the memory is disclosed. In such examples, the processor and the memory may be configured to: map a high priority hybrid automatic repeat request-acknowledgment/negative acknowledgment (HARQ-ACK/NACK) information to one or more resource elements (RE %) in an uplink transmission; and map one or more of a low priority HARQ-ACK/NACK information, channel state information (CSI), or uplink-shared channel (UL-SCH) data to REs in the uplink transmission, including mapping to rate match around the mapped one or more high priority HARQ-ACK/NACK REs in the uplink transmission.

In other examples, a method of communication at a network entity is disclosed. In such examples, the method of communication may include: receiving an uplink transmission, including high priority hybrid automatic repeat request-acknowledgment/negative acknowledgment (HARQ-ACK/NACK) information, low priority HARQ-ACK/NACK information, channel status information (CSI), and uplink-shared channel (UL-SCH) data mapped to high priority HARQ-ACK/NACK resource elements (REs), low priority HARQ-ACK/NACK REs, CSI REs, and UL-SCH REs, respectively, wherein the low priority HARQ-ACK/NACK REs, the CSI REs, and the UL-SCH REs are rate matched around the high priority HARQ-ACK/NACK REs; demapping the high priority HARQ-ACK/NACK REs, the low priority HARQ-ACK/NACK REs, the CSI REs, and the UL-SCH REs to obtain the high priority HARQ-ACK/NACK information, the low priority HARQ-ACK/NACK information, the CSI, and the UL-SCH data; and decoding the high priority HARQ-ACK/NACK information, the low priority HARQ-ACK/NACK information, the CSI, and the UL-SCH data.

In still other examples, a network entity, including a transceiver, a memory, and a processor communicatively coupled to the transceiver and the memory are disclosed. In these examples, the processor and the memory may be configured to: receive an uplink transmission, including high priority hybrid automatic repeat request-acknowledgment/negative acknowledgment (HARQ-ACK/NACK) information, low priority HARQ-ACK/NACK information, channel status information (CSI), and uplink-shared channel (UL-SCH) data mapped to high priority HARQ-ACK/NACK resource elements (REs), low priority HARQ-ACK/NACK REs, CSI REs, and UL-SCH REs, respectively, wherein the low priority HARQ-ACK/NACK REs, the CSI REs, and the UL-SCH REs are rate matched around the high priority HARQ-ACK/NACK REs; demap the high priority HARQ-ACK/NACK REs, the low priority HARQ-ACK/NACK REs, the CSI REs, and the UL-SCH REs to obtain the high priority HARQ-ACK/NACK information, the low priority HARQ-ACK/NACK information, the CST, and the UL-SCH data; and decode the high priority HARQ-ACK/NACK information, the low priority HARQ-ACK/NACK information, the CSI, and the UL-SCH data.

These and other aspects of the disclosure will become more fully understood upon a review of the detailed description, which follows. Other aspects, features, and examples of the present disclosure will become apparent to those of ordinary skill in the art, upon reviewing the following description of specific, example examples of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In a similar fashion, while example examples may be discussed below as device, system, or method examples it should be understood that such example examples can be implemented in various devices, systems, and methods.

DETAILED DESCRIPTION

Figure 1:
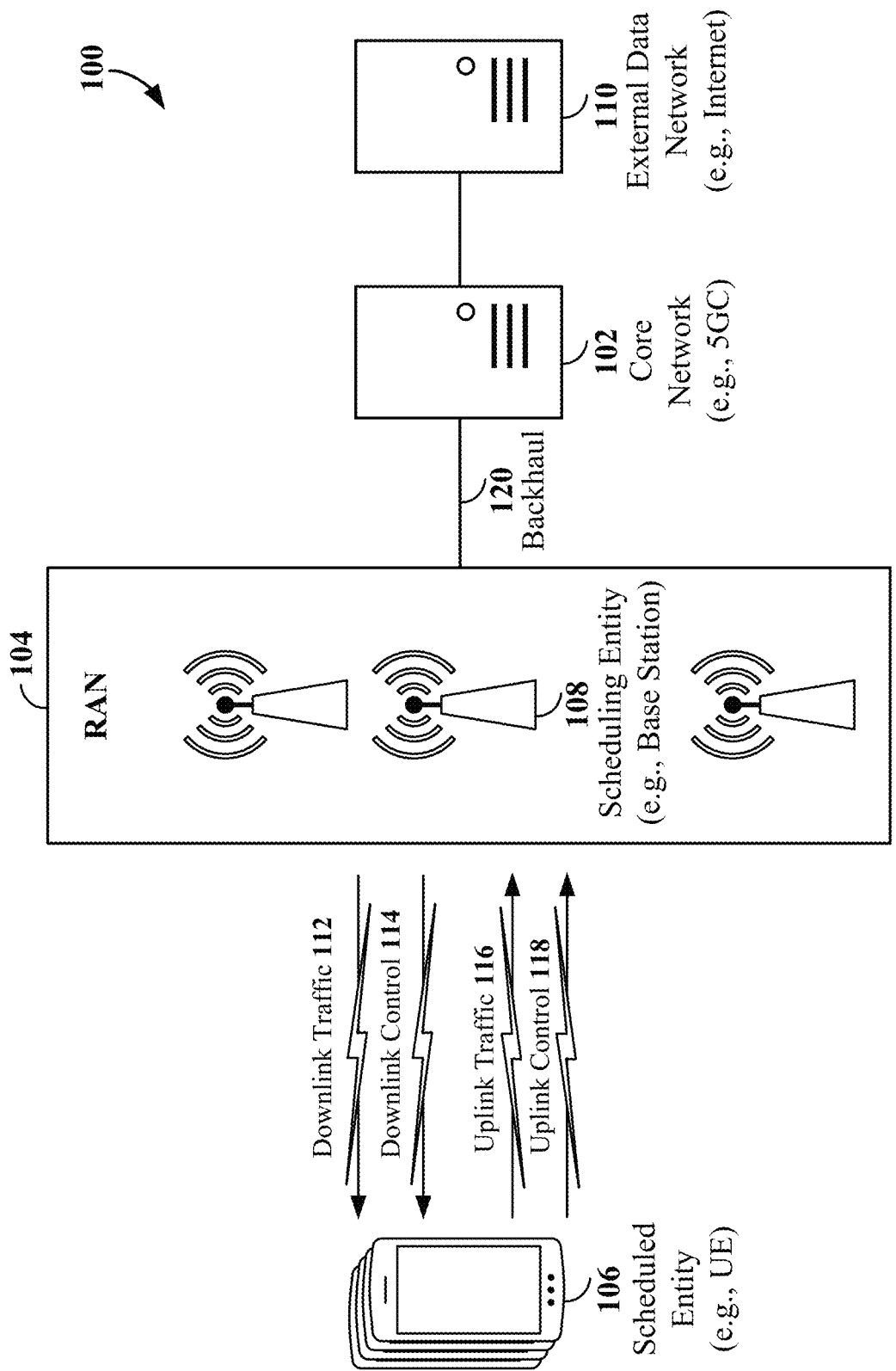
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some examples, well-known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices. AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components, including antenna, radio frequency (RF)-chains, power amplifiers, modulators, buffer, processor (s), interleaver, adders/summers, etc.). It is intended that innovations described herein may be practiced in a wide variety of devices, chip-level components, systems, distributed arrangements, disaggregated arrangements (e.g., base station and/or user equipment (UE)), end-user devices, etc. of varying sizes, shapes, and constitution.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into the mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the LE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays. RF-chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems. e.g., corresponding to an "Internet of Things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support. e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a LE 106) is a node or device that receives downlink control 114 information, including but not limited to scheduling information (e.g., a grant), synchronization or timing information, or other control information from another entity in the wireless communication network such as the scheduling entity 108. The scheduled entity 106 may further transmit uplink control 118 information, including but not limited to a scheduling request or feedback information, or other control information to the scheduling entity 108.

In addition, the uplink control 118 and/or downlink control 114 information and/or uplink traffic 116 and/or downlink traffic 112 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may can-y 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5G core (5GC)). In other examples, the core network 102 may be configured according to a 4G evolved packet core (EPC), or any other suitable standard or configuration.

Figure 2:
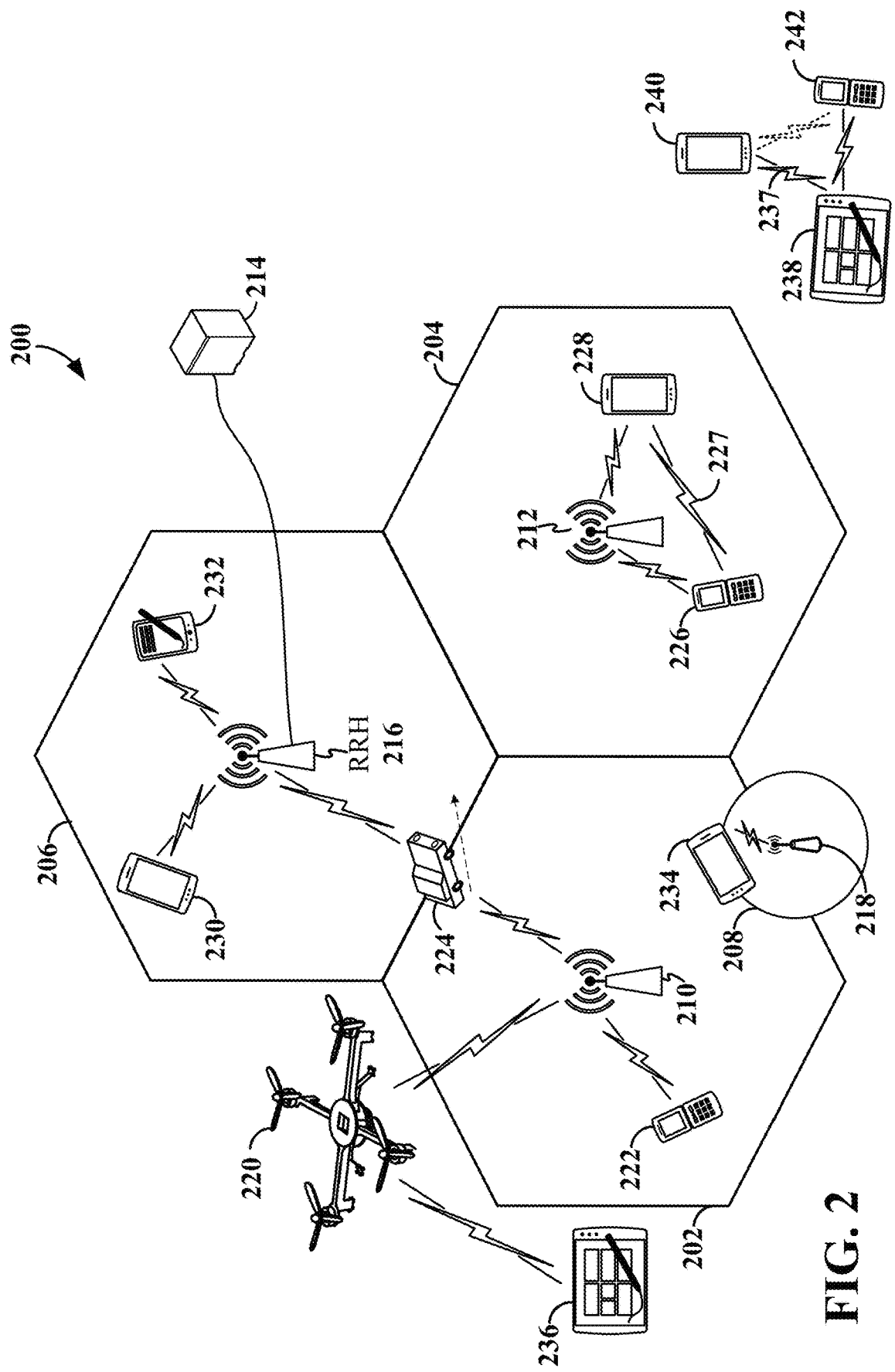
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a small cell, a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the LE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the LE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties. e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full-duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described hereinbelow. That is, while some examples of the present disclosure may focus on an OFDM link for clarity, it should be understood that the same principles may be applied as well to SC-FDMA waveforms.

Figure 3:
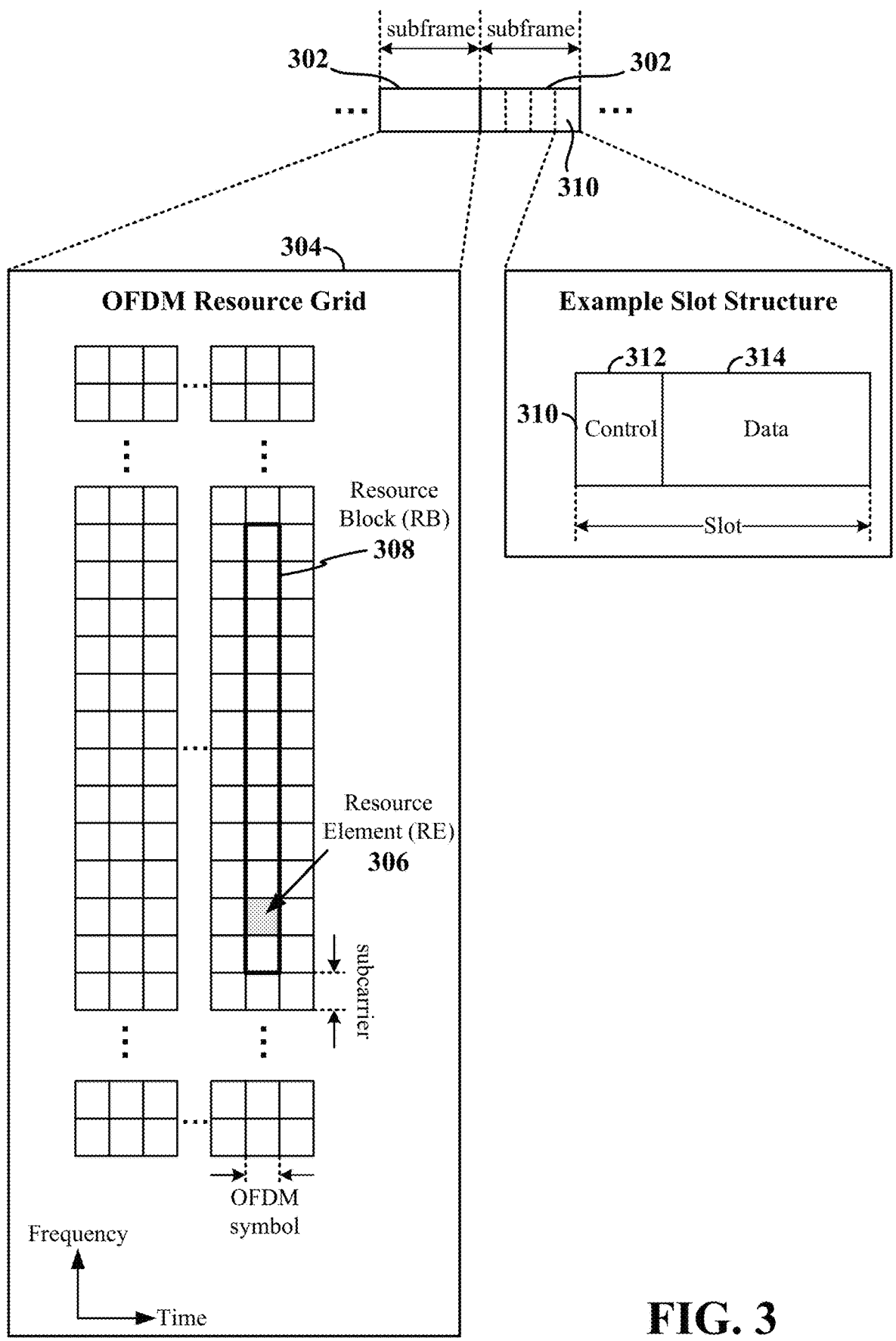
FIG. 3 is a schematic illustration of an example of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid according to some aspects of the disclosure. However, as those skilled in the art will readily appreciate, the physical layer (PHY) transmission structure for any particular application may vary from the example described here, depending on any number of factors. Here, time is in the horizontal direction with units of OFDM symbols, and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310, including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the scheduling entity (e.g., a base station) may allocate one or more REs 306 (e.g., within the control region 312) to carry DL control information, including one or more DL control channels, such as a physical downlink control channel (PDCCH), to one or more scheduled entities (e.g., UEs). The PDCCH carries downlink control information (DCI), including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI), including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data. Such data may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH), including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH), including sidelink data transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIGS. 1, 2, and 3 are not necessarily all of the channels or carriers that may be utilized between devices, and those of ordinary skill in the art will recognize that other channels or carriers may be utilized in addition to those illustrated, such as other traffic, control, and feedback channels.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS) (e.g., any of the scheduling entities as shown and described in connection with FIGS. 1 and 2), or one or more units (or one or more components) performing base station functionality, may be implemented in an aggregated or disaggregated architecture. For example, a BS (such as a Node B (NB), evolved NB (eNB), a gNB, an NR BS, a 5G NB, an access point (AP), a transmit receive point (TRP), a network entity, a mobility element of the network, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 4:
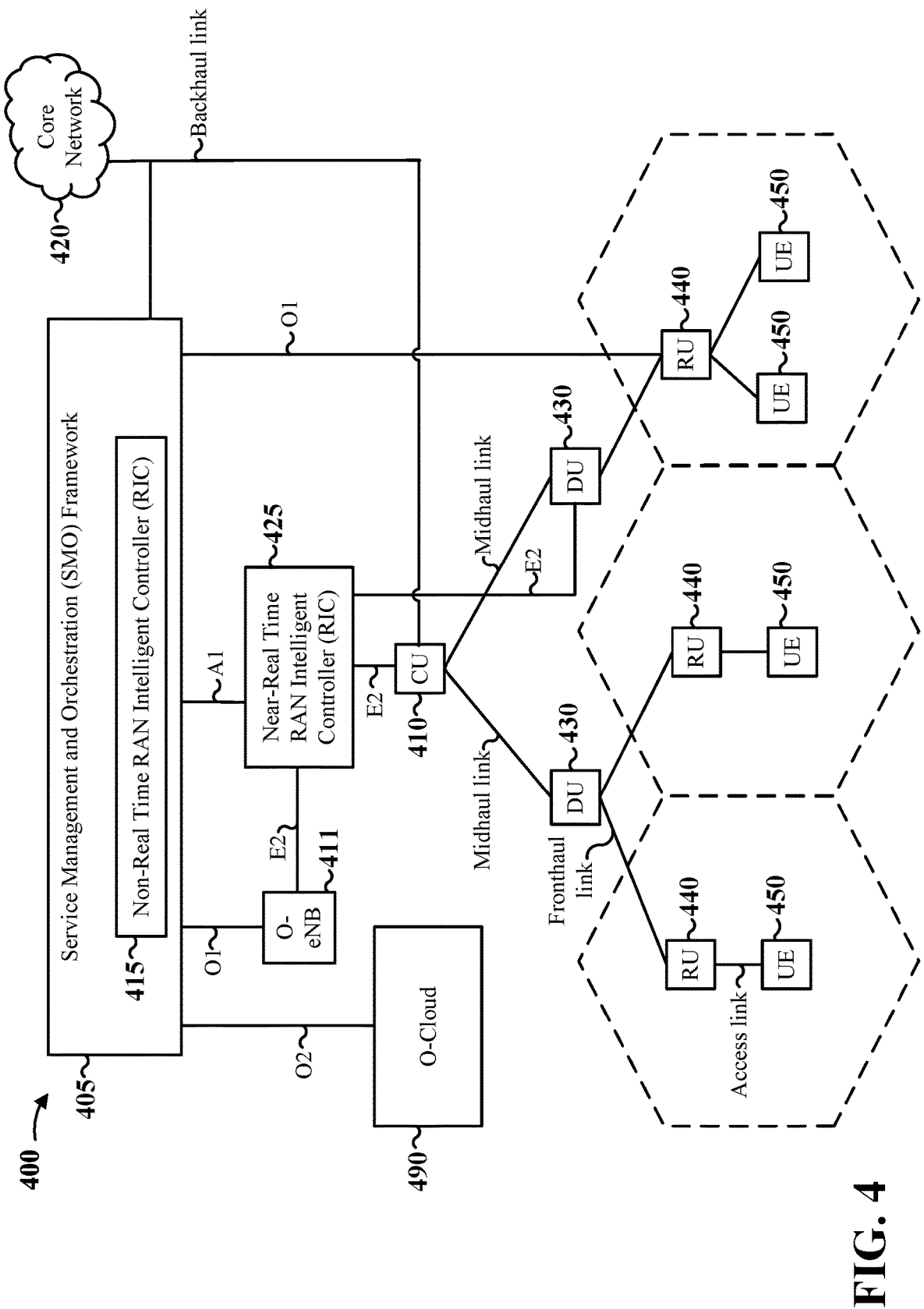
FIG. 4 is a diagram illustrating an example disaggregated base station architecture according to some aspects of the disclosure.

FIG. 4 is a diagram illustrating an example disaggregated base station 400 architecture according to some aspects of the disclosure. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 450 (e.g., any of the scheduled entities or UEs as shown and described in connection with FIGS. 1 and/or 2) via one or more radio frequency (RF) access links. In some implementations, the UE 450 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 450. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430. RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources. Artificial Intelligence/Machine Learning (AI/ML) workflows, including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
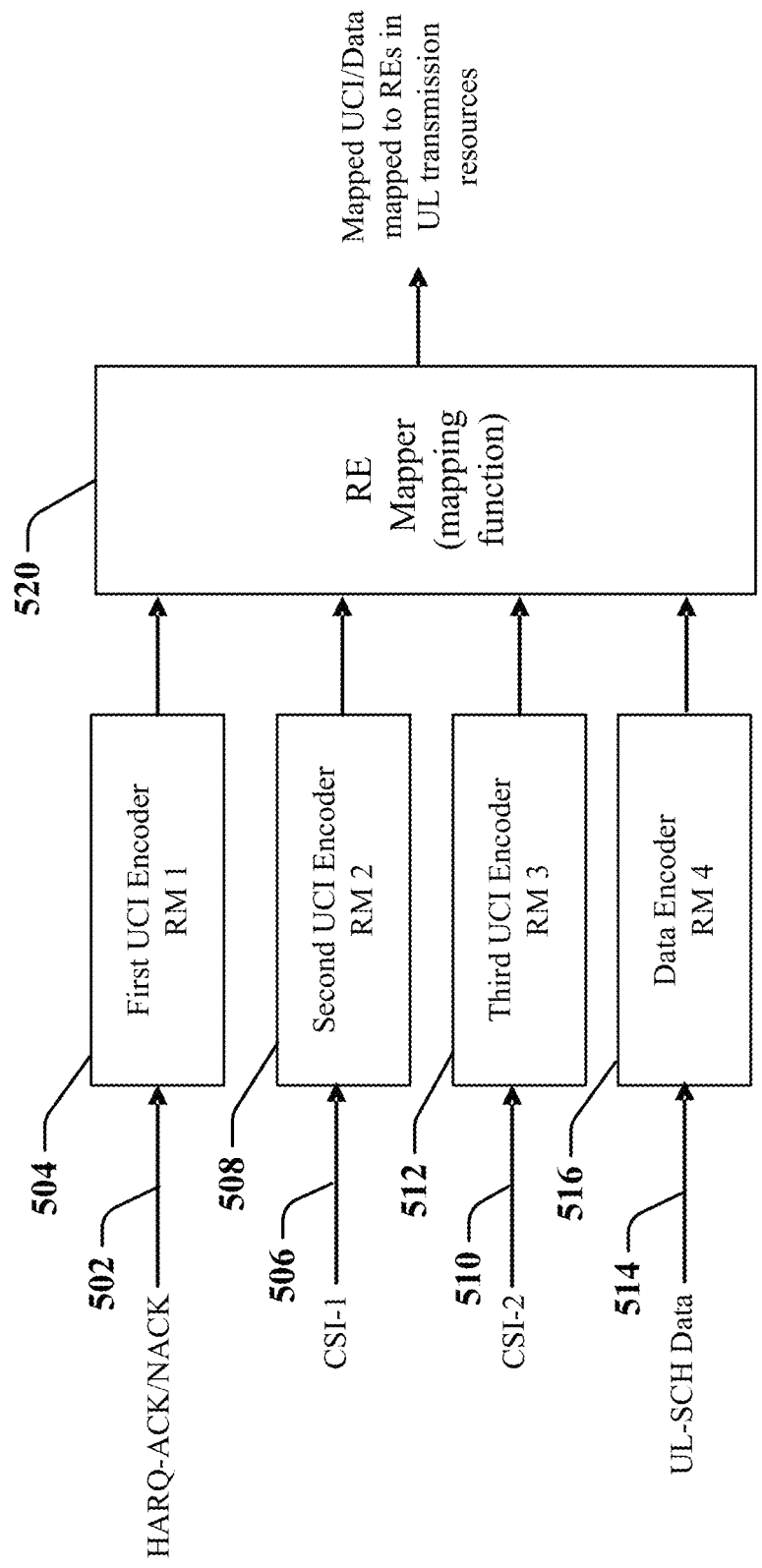
FIG. 5 illustrates a diagram of a scheme for encoding and mapping of various uplink control information (UCI) on a physical uplink channel according to some aspects.

FIG. 5 provides an illustration of a scheme or arrangement for encoding uplink control information (UCI) and mapping the encoded UCI to resource elements (REs) in uplink transmission slots. In the particular scheme illustrated in FIG. 5, HARQ-ACK/NACK information 502 is encoded by a first UCI encoder 504 (using first RE mapping (RM) rules (RM 1)), CSI-1 506 is encoded by a second UCI encoder 508 (using second RE mapping (RM) rules (RM 2)), CSI-2 510 is encoded by a third UCI encoder 512 (using third RE mapping (RM) rules (RM 3)), and uplink-shared channel (UL-SCH) data 514 is encoded by a data encoder 516 (using fourth RE mapping (RM) rules (RM 4)). The encoded UCI and UL-SCH data from encoders 504, 508, 512, and 516 are delivered to a resource element (RE) mapper 520 (or equivalent functionality), which maps the uplink control channel information (UCI) and the uplink transport channel data (UL-SCH) to REs of their corresponding physical channel (in this example the PUSCH) according to mapping rules. The payload of control information in the PUSCH is referred to herein as UCI, and the payload of the UL-SCH transport channel is termed UL-SCH data. That is, the physical channel, referred to as the physical uplink shared channel (PUSCH), may be used to transmit at least four types of payload: high priority HARQ-ACK information, low priority HARQ-ACK information, CSI, and UL-SCH data.

In some 5G NR systems, the mapping rules may depend on or be conditional upon whether the HARQ-ACK/NACK information is less than or equal to a predetermined number of bits or greater than this predetermined number of bits. A typical value for this predetermined number is 2 bits but is not necessarily limited to such.

Figure 6:
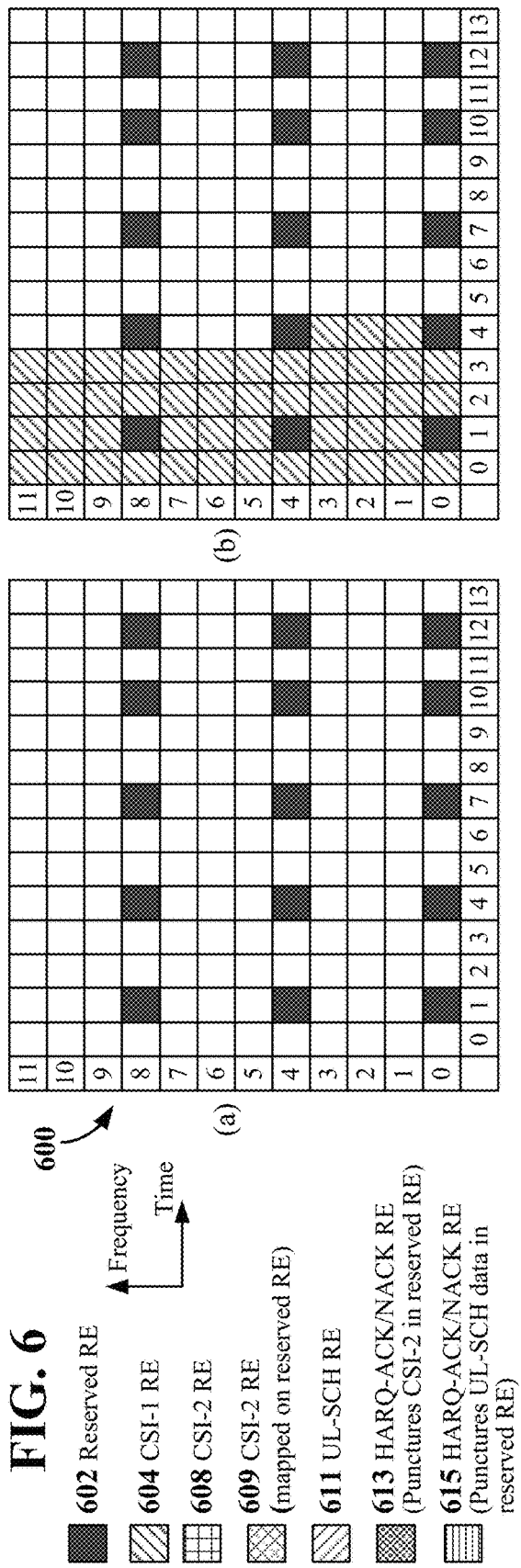
FIG. 6 illustrates mapped time and frequency resources following the mapping rules for the system of FIG. 5 according to some aspects.
Figure 6:
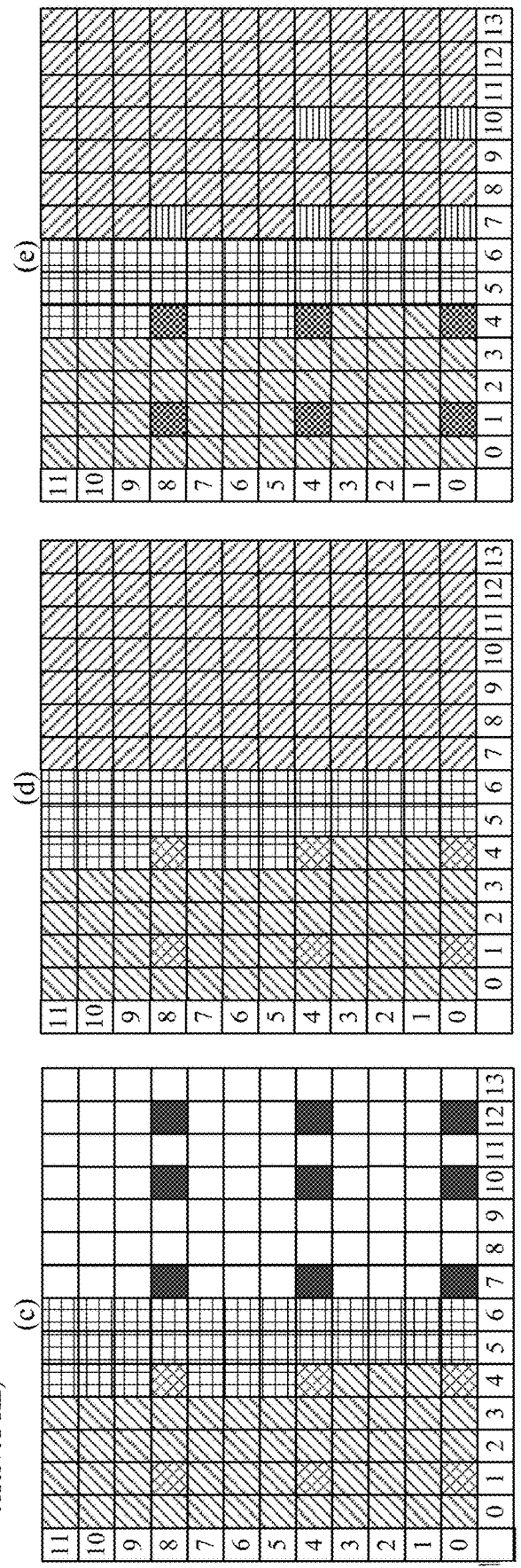

In some examples where the HARQ-ACK/NACK information is less than or equal to 2 bits, REs are reserved by the transmitter for the HARQ-ACK/NACK information assuming that this information is equal to 2 bits. The reason for reserving REs is to ensure that information such as the yet to be mapped HARQ-ACK/NACK will not puncture CSI-1 REs later, as one example. As an illustration of the mapping in a slot and/or subframe, FIG. 6 is presented in five sub-figures, 6(a), 6(b), 6(c), 6(d), and 6(e). Each sub-figure depicts the same portion of an OFDM resource grid 600 following an RE mapper's (e.g., 520 of FIG. 5) mapping of reserved REs for HARQ ACK/NACK information. CSI-1 REs, CSI-2 REs, and UL-SCH REs thereto, respectively.

In FIG. 6(a), the OFDM resource grid 600 is shown following a mapping of the reserved REs 602 to the OFDM resource grid 600. In describing the OFDM resource grid 600, reference will be made to a coordinate axis represented in the time dimension along the horizontal axis in units of OFDM symbols and in the frequency dimension along the vertical axis in units of subcarriers. OFDM index numbers along the horizontal axis and subcarrier index numbers along the vertical axis are provided for ease of reference and not limitation. A location in the just described coordinate system may be identified by reference to the OFDM index number followed by a comma followed by the subcarrier index number (e.g., (2,4) identifies OFDM index number 2 and subcarrier index number 4), the reserved REs 602 are shown at the intersections of the first, fourth, seventh, tenth, and twelfth OFDM index values and the zeroth, fourth, and eighth subcarrier index values.

In FIG. 6(b), the OFDM resource grid of FIG. 6(a) is depicted subsequent to the mapping of CSI-1 604 to REs. In the example of FIG. 6(b), the CSI-1 604 is mapped to various REs following a frequency-first, time-second ordering. In this example, CSI-1 604 is mapped to REs in the first (OFDM index=0) through the fifth (OFDM index=4) OFDM symbols. The depiction is exemplary and not limiting. In the example, when the RE mapper (e.g., 520 of FIG. 5) encounters a reserved RE 602, the mapping of the CSI-1 604 is "rate matched" around the reserved RE 602; i.e., the CSI-1 604 REs are mapped around, and do not take the place of, the respective reserved RE 602 (e.g., as shown at index coordinates (1,0), (1,4), (1,8), (4,0), and (4,4)).

In FIG. 6(c), the RE mapper (e.g., 520, of FIG. 5) has mapped CSI-2 608, 609 to REs. The RE mapper does not avoid mapping CSI-2 609 to reserved REs (i.e., reserved REs 602 of FIGS. 6(a) and 6(b)). That is, the RE mapper may map CSI-2 609 to reserved REs as shown at (1,0), (1,4), (1,8), (4,0), (4,4) and (4,8). However, the RE mapper may avoid mapping CSI-2 to REs already mapped to CSI-1 604. In other words, the RE mapper may rate match CSI-2 REs 608, 609 around the mapped CSI-1 604 REs.

In FIG. 6(d), the RE mapper (e.g., 520 of FIG. 5) maps UL-SCH data 611 to various REs. Again, the RE mapper does not avoid (i.e., it can map to) the reserved REs 602 (e.g., at (7,0), (7,4), (7,8), (10,0), (10,4), (10,8), (12.0), (12.4), and (12,8)). In other words, the RE mapper maps UL-SCH data 611 to REs despite those REs being the reserved REs 602 (as shown in FIGS. 6(a), 6(b), and 6(c)). The RE mapper may map the UL-SCH data 611 following a frequency-first, time-second ordering. The RE mapper does, however (as shown in the example), avoid mapping UL-SCH data to already mapped CSI-1 604 and CSI-2 608, 609 REs (without regard to whether the CSI-1 604 and CSI-2 608, 609 were mapped to reserved REs). That is, the RE mapper rate matches around REs mapped to CS1-1 604 and CSI-2 608, 609.

In FIG. 6(e), the RE mapper (e.g., 520 of FIG. 5) maps HARQ-ACK/NACK 613 to reserved REs and may also map the HARQ-ACK/NACK to CSI-2 and/or UL-SCH data already mapped to the reserved REs. That is HARQ-ACK/NACK 613 punctures (e.g., replaces) CSI-2 that was mapped to reserved REs (e.g., at (1,0), (1,4), (1,8), (4,0), (4,4), and (8,8)) and HARQ-ACK/NACK 615 punctures (e.g., replaces) UL-SCH data that was mapped to reserved REs (e.g., at (7,0), (7,4), (7,8), (10,0), and (10,4)).

In the case where the HARQ-ACK/NACK is greater than the predetermined number of bits (e.g., greater than 2 bits), the rules for RE mapping may instead include first mapping the HARQ-ACK/NACK information to HARQ-ACK/NACK REs, then mapping CSI-1 to further REs while rate matching around the HARQ-ACK/NACK REs already mapped. Further, CSI-2 is next mapped to REs, including rate matching around the already mapped HARQ-ACK/NACK REs and CSI-1 REs. Finally. UL-SCH data is mapped to REs, including rate matching around the already mapped HARQ-ACK/NACK REs. CSI-1 REs, and CSI-2 REs.

In some 5G NR systems, high priority and low priority multiplexed transmissions utilize separately encoded high priority and low priority HARQ-ACK/NACK information while maintaining the same number of encoding chains used in previously developed 5G NR systems (e.g., Release 15 or 16). In the case where the high priority and low priority HARQ-ACK/NACKs are multiplexed into a PUSCH in other systems, such as 5G NR Release 16, separate coding for the high priority and low priority HARQ-ACK/NACKs may be supported. In a system with four (4) maximum UCI encoders, such as was illustrated in FIG. 5, if the high priority and low priority HARQ-ACK/NACK are separately encoded, this leaves two other encoders, one of which may be used for low priority CSI-1 and the other of which may be used for the UL-SCH data. This gives rise to the situation where the CSI-2 will be dropped.

Figure 7:
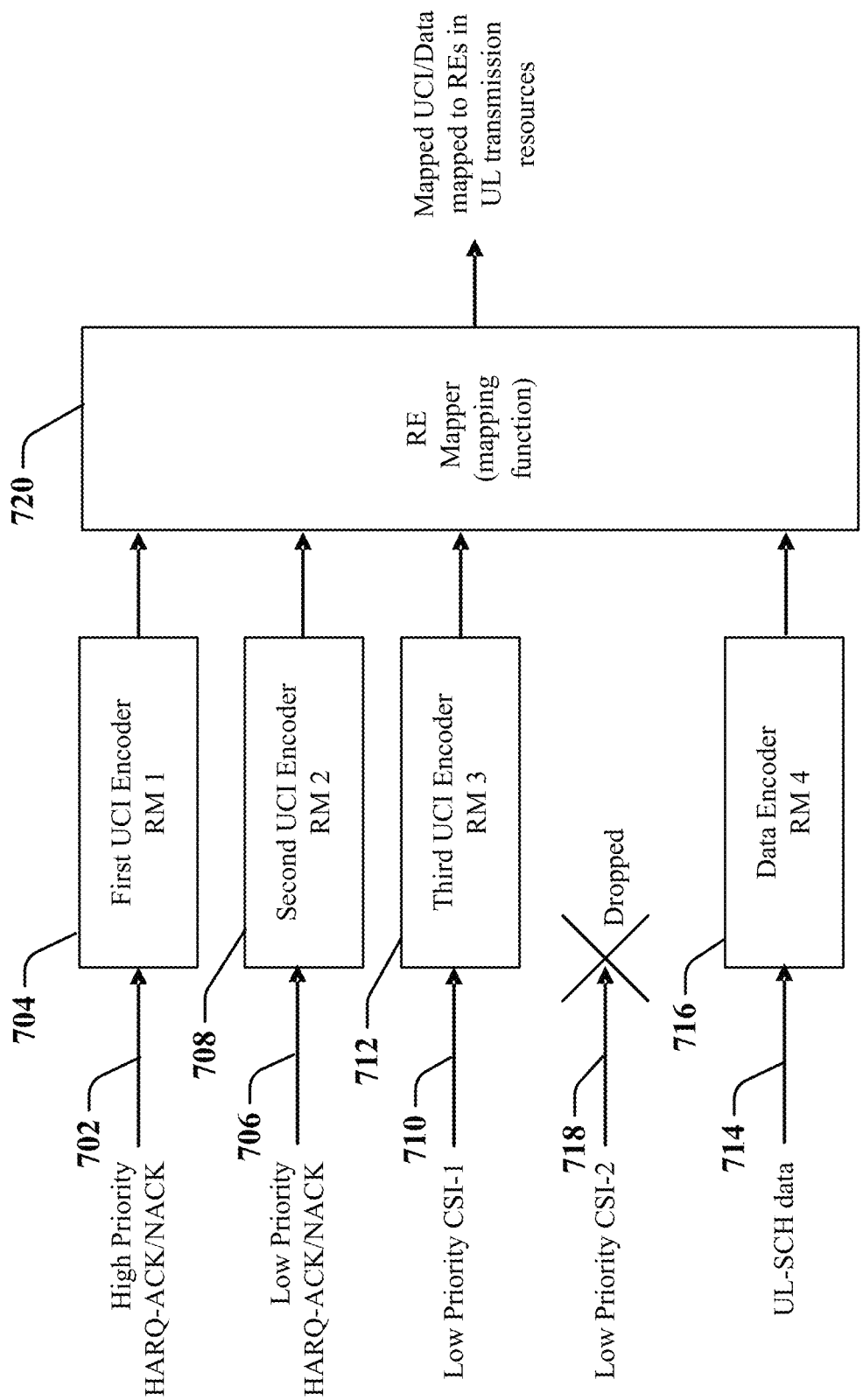
FIG. 7 illustrates a diagram of another scheme for encoding and mapping of various uplink control information (UCI) on a physical uplink channel with high priority and low priority HARQ-ACK/NACK according to some aspects.

As an illustration of this scheme, FIG. 7 illustrates a scenario where high priority HARQ-ACK/NACK information 702 is encoded using a first UCI encoder 704 (using first RE mapping (RM) rules (RM 1)). It is noted that the first UCI encoder 704 may be configured according to previous encoding algorithms or equations (e.g., Release 15 RE mapping encoding). Further, low priority HARQ-ACK/NACK information 706 is encoded using a second UCI encoder 708 (using second RE mapping (RM) rules (RM 2)). It is noted that the second UCI encoder 708 may be configured according to previous encoding algorithms or equations (e.g., Release 15 RE mapping encoding) and may be a reuse of the second UCI encoder 508 (used to encode CSI-1) in FIG. 5.

FIG. 7 further illustrates that low priority CSI-1 information 710 is encoded with a third UCI encoder 712 (using third RE mapping (RM) rules (RM 3)). The third UCI encoder 712 may be configured according to previous encoding algorithms or equations (e.g., Release 15 RE mapping encoding). Also, in the example of FIG. 7, the third UCI encoder 712 may be a reuse of the third UCI encoder 512 (used to encode CSI-2) in FIG. 5. Moreover, the UL-SCH data 714 may be encoded with a data encoder 716 (using fourth RE mapping (RM) rules (RM 4)). Like the first UCI encoder 704, the second UCI encoder 708, and third UCI encoder 712, the data encoder 716 may be configured according to previous encoding algorithms or equations (e.g., Release 15 RE mapping encoding). Also, the data encoder 716 may be a reuse of the data encoder 516 (used to encode UL-SCH data in FIG. 5). It is noted that RM 1-RM 4 of FIGS. 5 and 7 may be the same or different RE mapping rules.

As noted above, the low priority CSI-2 718 information, as illustrated in FIG. 7, is dropped and not mapped to REs in the uplink transmission by the RE mapper 720 in the case where the same number of encoding chains used in previously developed 5G NR systems is maintained. The RE mapper 720 may be configured to reuse the mapping rules discussed above in connection with FIGS. 5 and 7 by treating the high priority HARQ-ACK/NACK information the same as the Release 15 HARQ-ACK/NACK information, the low priority HARQ-ACK/NACK information the same as Release 15 CSI-1, the low priority CSI-1 the same as Release 15, CSI-2, and the UL-SCH data the same as Release 15 UL-SCH data. Thus, given the scheme of FIGS. 5 and 7, for example, the mapping would include, for the high priority HARQ-ACK/NACK being less than or equal to 2 bits, reserving REs for the high priority HARQ-ACK/NACK, mapping the low priority HARQ-ACK/NACK information to rate match around the reserved REs, mapping the low priority CSI-1 to REs by ignoring the reserved REs and rate matching around the low priority HARQ-ACK/NACK, and mapping the UL-SCH data to UL-SCH REs by again ignoring the reserved REs and rate matching around the low priority HARQ-ACK/NACK and the low priority CSI-1. Lastly, the high priority HARQ-ACK/NACK would be mapped to the reserved REs, thereby potentially puncturing the low priority CSI-1 and/or UL-SCH data. However, this mapping may not be optimal as the CSI-1 and the UL-SCH data may always be rate matched around the low priority HARQ-ACK/NACK information. That is, due to mis-detecting a low priority DCI, which schedules a low priority HARQ-ACK/NACK, the low priority HARQ-ACK/NACK payload size could cause ambiguity at a gNB, which could adversely affect decoding of the CSI-1 and the UL-SCH data. The mis-detection may result, for example and without limitation, where the low priority DCI scheduling the low priority HARQ-ACK/NACK may be transmitted by the gNB; however, that low priority DCI may be missed by the LE, because, for example, the UE's PDCCH decoding may not be 100% reliable.

In light of the foregoing, according to some aspects of this disclosure, mapping rules may include that the other UCI and UL-SCH data (e.g., low priority HARQ-ACK/NACK information, low priority CSI-1, and UL-SCH data) may always rate match around mapped high priority HARQ-ACK/NACK REs. Further, this configuration of rate matching around the mapped HARQ-ACK/NACK REs may involve one or more of: (1) utilizing new or modified RE mapping (RM) rules implemented by an RE mapper or mapping function; (2) padding bits of the low priority HARQ-ACK/NACK information without using RE reservation and/or puncture to use slightly modified Release 15 mapping rules; or (3) padding bits of the low priority HARQ-ACK/NACK information with RE reservation and/or puncture to use previous Release 15 mapping rules.

Figure 8:
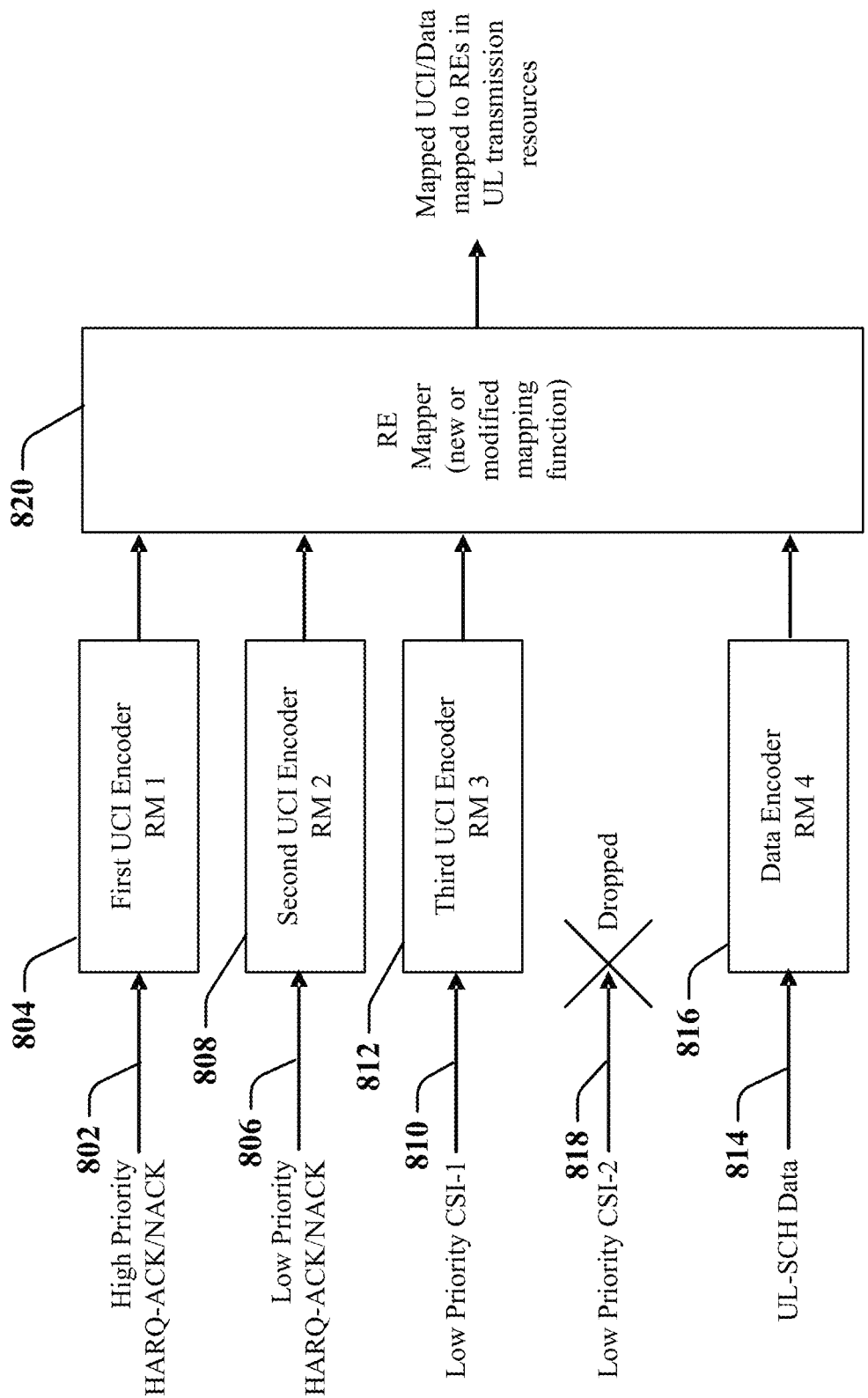
FIG. 8. illustrates a diagram of yet another scheme for encoding and mapping of various uplink control information (UCI) on a physical uplink channel with high priority and low priority HARQ-ACK/NACK according to some aspects.

FIG. 8 illustrates a diagram of a scheme for encoding and mapping UCI, including high priority and low priority HARQ-ACK/NACK information and UL-SCH data according to some aspects. Similar to FIG. 7 above, high priority HARQ-ACK/NACK information 802 is encoded using a first UCI encoder 804, low priority HARQ-ACK/NACK information 806 is encoded using a second UCI encoder 808, low priority CS1-1 information 810 is encoded with a third UCI encoder 812, and UL-SCH data 814 may be encoded with a data encoder 816. Additionally, the low priority CSI-2 818 is dropped and not mapped to REs in the uplink transmission by the RE mapper 820. Different from the example of FIG. 7; however, RE mapper 820 is configured with a new or modified mapping function that ensures that all other UCI and PUSCH data (e.g., UL-SCH data) are always rate matched around the high priority HARQ-ACK/NACK information mapped to REs. According to one aspect, the new or modified mapping function may implement RE mapping rules that are different from RE mapping rules in Release 15, for example.

Figure 9:
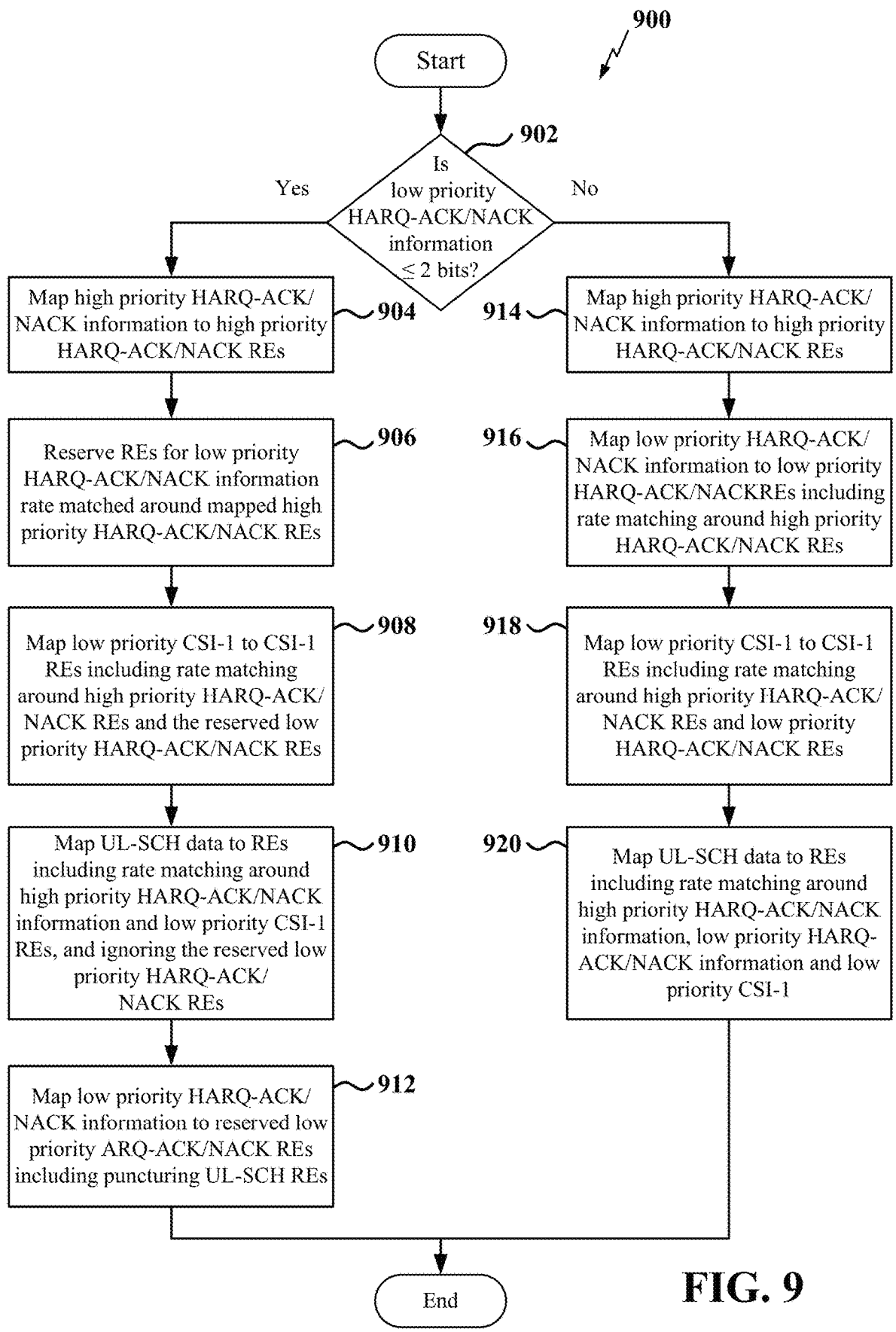
FIG. 9 illustrates a flow diagram of a method of mapping using the scheme of FIG. 8 according to some aspects.

FIG. 9 illustrates a flow diagram of a method 900 for mapping UCI and PUSCH to REs as employed by the scheme of FIG. 8 and RE mapper 820, in particular. In an aspect, method 900 may be implemented in a processor, hardware, or equivalent devices in a LE.

As illustrated, method 900 includes determining whether low priority HARQ-ACK/NACK information is less than or equal to X bits (e.g., 2 bits or some predetermined number of bits in other aspects) at decision block 902. If yes, flow proceeds to block 904, where the high priority HARQ-ACK/NACK information is mapped to REs. After mapping the high priority HARQ-ACK/NACK information to the REs, flow proceeds to block 906 where REs are reserved for the low priority HARQ-ACK/NACK information and the reserved REs are rate matched around the mapped high priority HARQ-ACK/NACK REs. Next, low priority CSI-1 is mapped to REs, including rate matching the low priority CSI-1 around the high priority HARQ-ACK/NACK REs and the reserved REs for the low priority HARQ-ACK/NACK information as shown at block 908.

Method 900 further includes mapping the UL-SCH data to UL-SCH REs, including rate matching around high priority HARQ-ACK/NACK and low priority CSI-1 (e.g., rate matching around the mapped one or more high priority HARQ-ACK/NACK REs and the CSI REs) and ignoring the reserved REs for the low priority HARQ-ACK/NACK as shown in block 910. The low priority HARQ-ACK/NACK information is then mapped to the reserved REs, including puncturing UL-SCH REs as shown at block 912. Flow then proceeds to an end block from block 912.

Alternatively, at decision block 902, if the low priority HARQ-ACK/NACK information is more than X bits, flow proceeds to block 914, where the high priority HARQ-ACK/NACK information is mapped to REs in uplink transmission resources. Next, the low priority HARQ-ACK/NACK information is mapped to REs, including rate matching around the mapped high priority HARQ-ACK/NACK REs as shown at block 916. Further, method 900 includes mapping low priority CSI-1, including rate matching around the high priority HARQ-ACK/NACK REs and the low priority HARQ-ACK/NACK REs as illustrated at block 918. Finally, the UL-SCH data is mapped to REs, where the mapping includes rate matching around the high priority HARQ-ACK/NACK REs. The low priority HARQ-ACK/NACK REs and the low priority CSI-1 REs as shown at block 920. Flow then proceeds to the end block from block 920.

Figure 10:
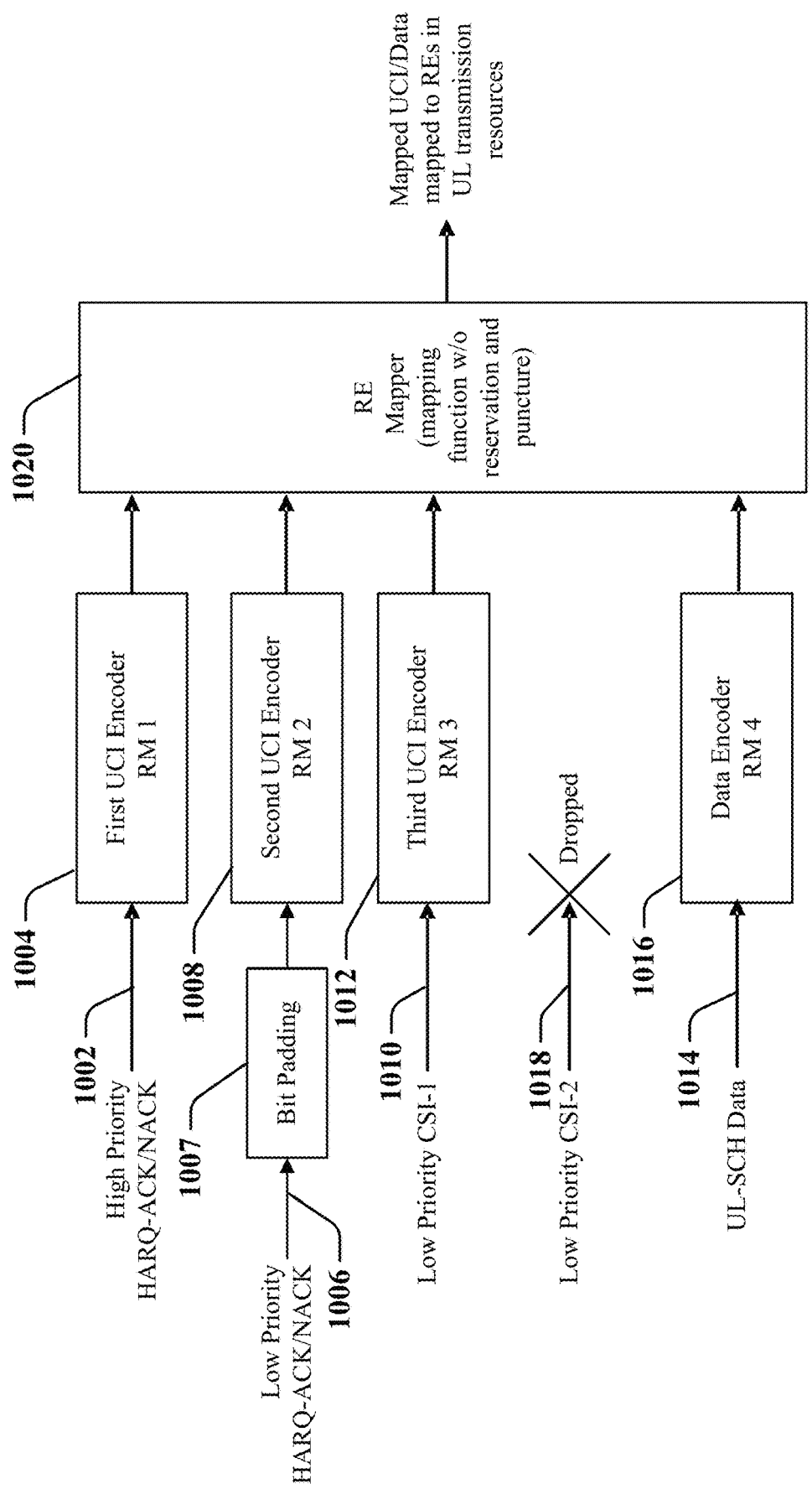
FIG. 10 illustrates a diagram of another scheme for encoding and mapping of UCI and uplink-shared channel (UL-SCH) data using bit padding according to some aspects.

As mentioned above, the mapping scheme of FIG. 9 may include padding of bits of the low priority HARQ-ACK/NACK information in order to use mapping that is closer to the mapping previously implemented, such as was discussed in connection with FIGS. 5, 7, and/or 8 and is known in 5G NR Release 15. For example. FIG. 10 illustrates a diagram of another scheme for encoding and mapping UCI, including high priority and low priority HARQ-ACK/NACK information and UL-SCH data using bit padding according to some aspects.

Similar to FIG. 8 above, high priority HARQ-ACK/NACK information 1002 is encoded using a first UCI encoder 1004. For the low priority HARQ-ACK/NACK information 1006, however, a further bit padding functionality or bit padder 1007 is included for first padding the low priority HARQ-ACK/NACK information with extra bits such that the total size is equal to a predetermined number (X) of bits prior to encoding with second UCI encoder 1008. In some aspects, the X number of bits may be two or three but is not limited to such. Furthermore, the added bits may be dummy NACKs. In certain aspects, the bit padding functionality or bit padder 1007 may be applied in response to determining that the size of the low priority HARQ-ACK/NACK information is less than or equal to the predetermined X bits (e.g., two (2) or three (3) bits). It is noted that the use of padding allows the RE mapping with an RE mapper 1020 to reuse Release 15 RE mapping equations.

As further shown in FIG. 10, low priority CSI-1 1010 is encoded with a third UCI encoder 1012, and UL-SCH data 1014 may be encoded with a data encoder 1016. Additionally, the low priority CSI-2 1018 is dropped and not mapped to REs in the uplink transmission by the RE mapper 1020. According to further aspects, it is noted that the RE mapping functionality of RE mapper 1020 may include mapping without the use of reserved REs and later puncturing.

Figure 11:
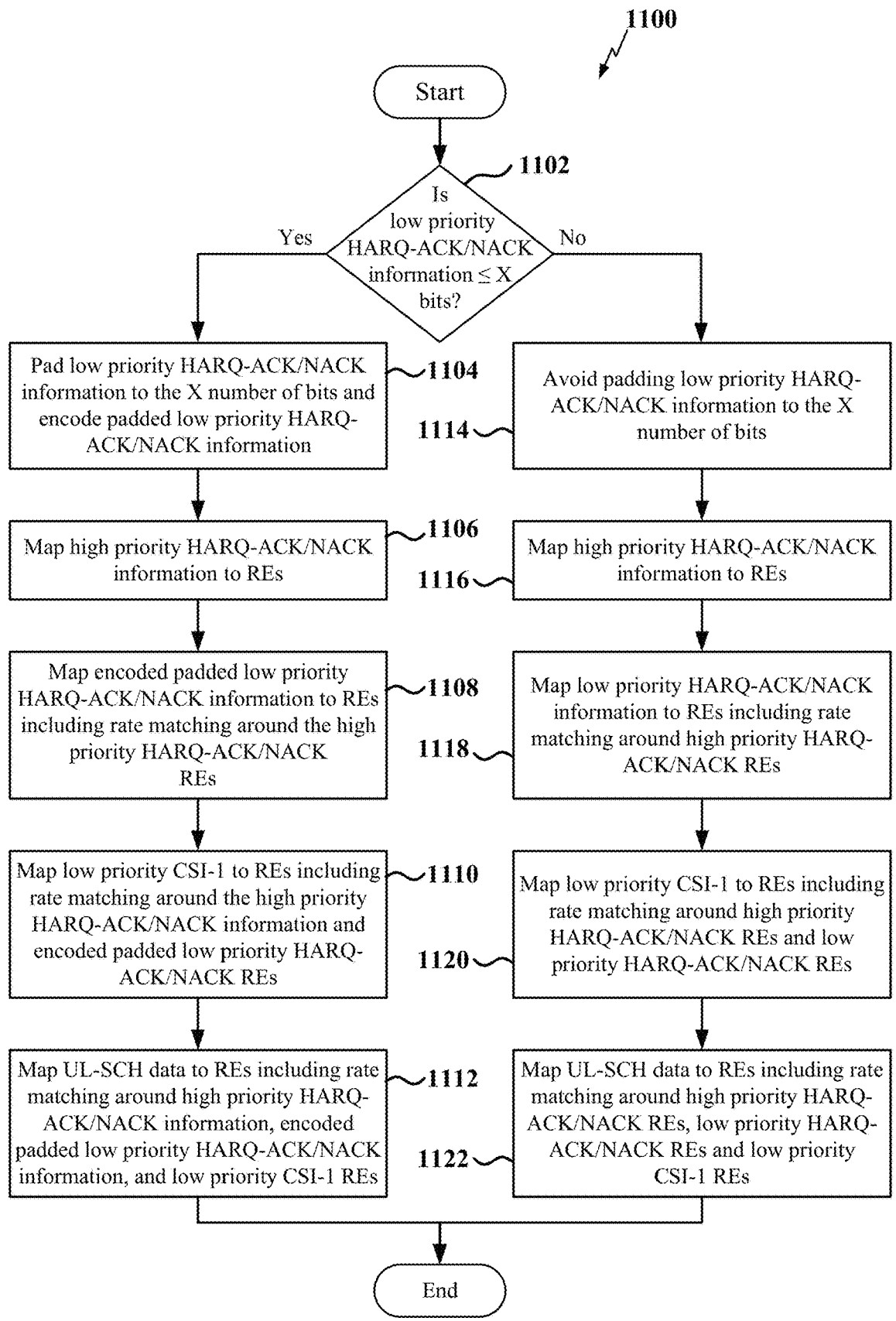
FIG. 11 illustrates a flow diagram of a method of mapping using the scheme of FIG. 10 according to some aspects.

FIG. 11 illustrates a flow diagram of a method 1100 for mapping UCI and PUSCH to REs as employed by the scheme of FIG. 10 and RE mapper 1020, in particular. In an aspect, method 1100 may be implemented in a processor, hardware, or equivalent devices in a UE.

As illustrated, method 1100 includes determining whether low priority HARQ-ACK/NACK information is less than or equal to an X number of bits (e.g., X=2 bits according to some aspects, X may be a predetermined number of bits) at decision block 1102. If yes, flow proceeds to block 1103 where low priority HARQ-ACK/NACK is padded to the X number of bits (as well as encoded such as with the second UCI encoder 1008 in FIG. 10; i.e., the low priority HARQ-ACK/NACK is first padded and then the padded low priority HARQ-ACK/NACK is encoded). In an example, it is noted that the padding may be performed even if the low priority HARQ-ACK/NACK is 0 bits. As mentioned above, the padding may be accomplished by adding dummy NACKs (or some equivalent thereof).

After padding the low priority HARQ-ACK/NACK information in block 1104, the high priority HARQ-ACK/NACK information is mapped to REs, as shown in block 1106. The mapping here may be performed without reserved REs (and later puncturing thereof). In some aspects, the padding in block 1104 may be performed either before or after the processes of block 1106.

After mapping the high priority HARQ-ACK/NACK information to the REs in block 1106, flow proceeds to block 1108, where the encoded padded low priority HARQ-ACK/NACK information is mapped to REs, including rate matching around the already mapped high priority HARQ-ACK/NACK REs. Method 1100 further includes mapping the low priority CSI-1 to REs, including rate matching around the already mapped high priority HARQ-ACK/NACK and low priority HARQ-ACK/NACK REs as shown at block 1110. Next, the UL-SCH data is mapped to REs, including rate matching around the previously mapped high priority HARQ-ACK/NACK, low priority HARQ-ACK/NACK, and low priority CSI-1 REs, as shown in block 1112. Flow then proceeds to an end block from block 1112.

Alternatively, at decision block 1102, if the low priority HARQ-ACK/NACK information is greater than the X number of bits, flow proceeds to block 1114 where, in response to determining that the size of the low priority HARQ-ACK/NACK information is greater than the X number of bits, not padding the low priority HARQ-ACK/NACK information to the X number of bits.

At block 1116, the high priority HARQ-ACK/NACK information is mapped to REs in uplink transmission resources, again without reserved REs and later puncturing. Next, the low priority HARQ-ACK/NACK information is mapped to REs, including rate matching around the mapped high priority HARQ-ACK/NACK REs as shown at block 1118. Further, method 1100 includes mapping low priority CSI-1, including rate matching around the high priority HARQ-ACK/NACK REs and the low priority HARQ-ACK/NACK REs as illustrated at block 1120. Next, the UL-SCH data is mapped to REs, where the mapping includes rate matching around the high priority HARQ-ACK/NACK REs. The low priority HARQ-ACK/NACK REs and the low priority CSI-1 REs as shown at block 1122. Flow then proceeds to the end block from block 1122.

Figure 12:
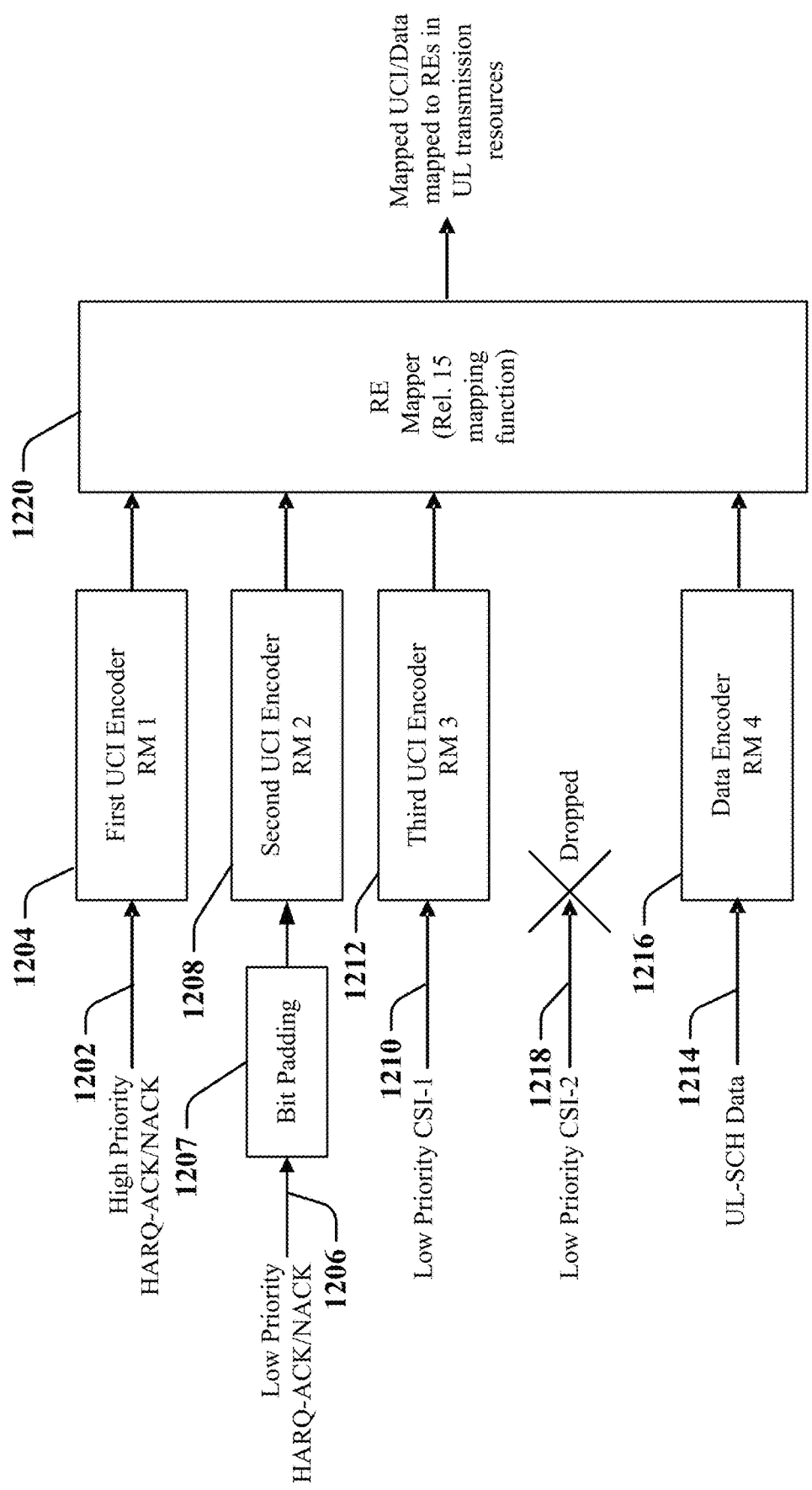
FIG. 12 illustrates a diagram of another scheme for encoding and mapping of UCI and UL-SCH data using bit padding according to some aspects.

FIG. 12 illustrates a diagram of yet another scheme for encoding and mapping UCI and UL-SCH data using bit padding according to some aspects. In this example, the scheme is configured to afford complete and unaltered reuse of RE mapping is according to Release 15 when mapping both high priority and low priority HARQ-ACK/NACK. Different from the example of FIGS. 10 and 11, the scheme in FIG. 12 utilizes reserved tones or REs and puncturing of the reserved REs with high priority HARQ-ACK/NACK information bits. Similar to the example of FIGS. 10 and 11, the high priority HARQ-ACK/NACK information 1202 is encoded using a first UCI encoder 1204. For the low priority HARQ-ACK/NACK information 1206, again, a further bit padding functionality or bit padder 1207 is included for first padding the low priority HARQ-ACK/NACK information with extra bits such that the total size is equal to a predetermined number (X) of bits prior to encoding with a second UCI encoder 1208. In some aspects, the X number of bits may be two or three but is not limited to such. Furthermore, the added bits may be dummy NACKs. In certain aspects, the bit padding functionality or bit padder 1207 may be applied in response to determining that the size of the low priority HARQ-ACK/NACK information is less than or equal to the predetermined X bits (e.g., two (2) or three (3) bits).

As further shown in FIG. 12, low priority CSI-1 1210 is encoded with a third UCI encoder 1212, and UL-SCH data 1214 may be encoded with a data encoder 1216. Additionally, the low priority CSI-2 1218 is dropped and not mapped to REs in the uplink transmission by the RE mapper 1220. According to further aspects, the RE mapping functionality of RE mapper 1220 may include mapping rules that follow the 5G NR Release 15 mapping rules without alteration.

Figure 13:
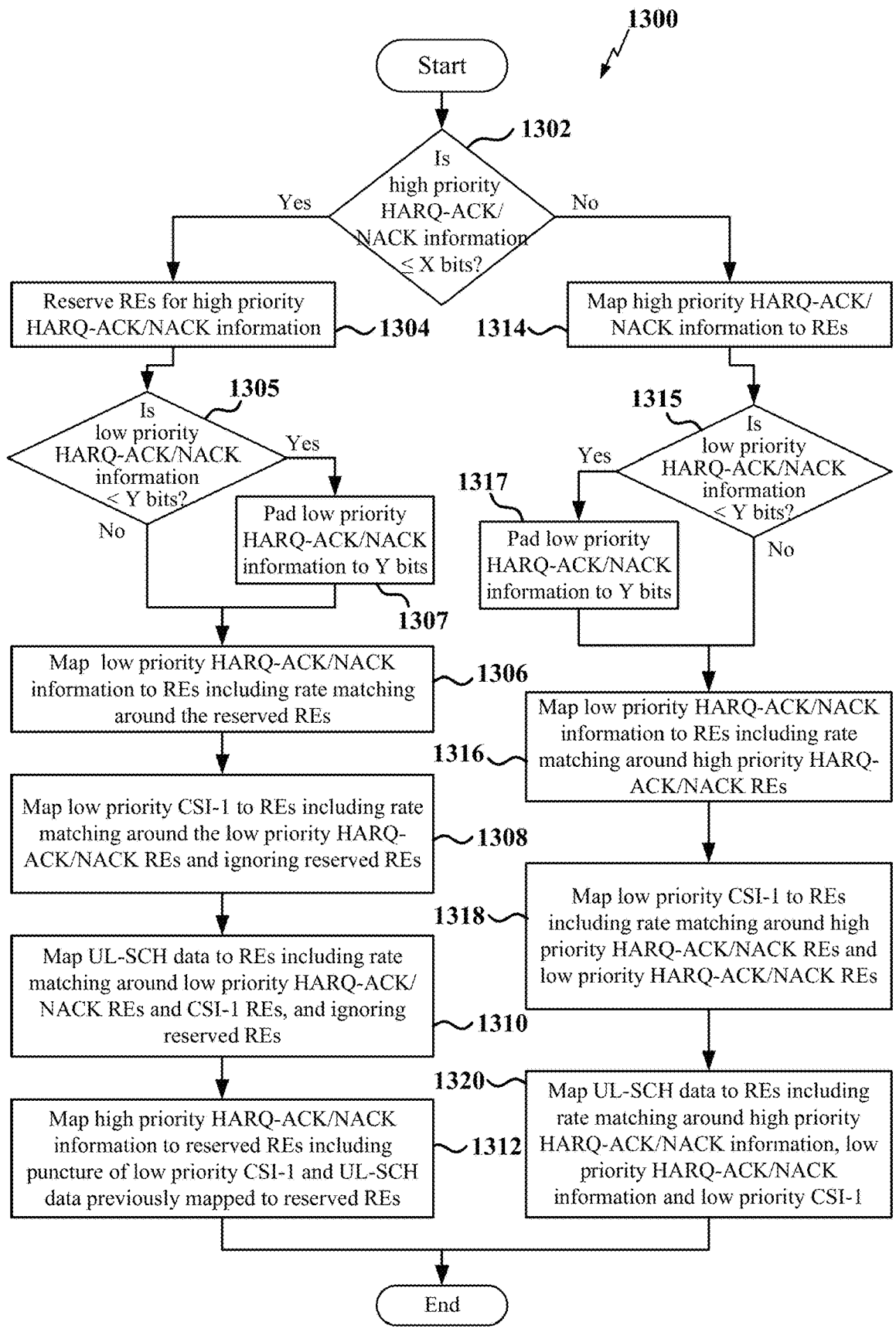
FIG. 13 illustrates a flow diagram of a method of mapping using the scheme of FIG. 12 according to some aspects.

FIG. 13 illustrates a flow diagram of a method 1300 for mapping UCI and PUSCH to REs as employed by the scheme of FIG. 12 and RE mapper 1220, in particular. In an aspect, method 1300 may be implemented in a processor, hardware, or equivalent devices in a UE.

As illustrated, at decision block 1302, the method 1300 includes determining whether high priority HARQ-ACK/NACK information is less than or equal to X bits (e.g., 2 or 3 bits) according to some aspects. If yes, flow proceeds to block 1304 where REs for high priority HARQ-ACK/NACK information are reserved. Next, at block 1306 the low priority HARQ-ACK/NACK information may be padded to the X bits in response to determining, at decision block 1302, that the low priority HARQ-ACK/NACK information is less than or equal to the X number of bits, according to some aspects. Additionally, block 1306 may include mapping the low priority HARQ-ACK/NACK information to low priority HARQ-ACK/NACK REs, including rate matching around the reserved REs.

Method 1300 further includes mapping the low priority CSI-1 to REs, including rate matching around the already mapped low priority HARQ-ACK/NACK REs and ignoring the reserved REs as shown at block 1308. Next, the UL-SCH data is mapped to REs, including rate matching around the previously mapped low priority HARQ-ACK/NACK and low priority CSI-1 REs, and again ignoring the reserved REs as shown in block 1310. Next, the high priority HARQ-ACK/NACK information is mapped to the reserved REs at block 1312, including puncture of the low priority CSI-1 and UL-SCH REs previously mapped to the reserved REs due to ignoring the reserved REs in blocks 1308 and 1310. Flow then proceeds to an end block from block 1312.

Alternatively, at decision block 1302, if the low priority HARQ-ACK/NACK information is greater than the X bits, flow proceeds to block 1314 where the high priority HARQ-ACK/NACK information is first mapped to REs in uplink transmission resources. Next, the low priority HARQ-ACK/NACK information is mapped to REs, including rate matching around the mapped high priority HARQ-ACK/NACK REs as shown at block 1316. Further, method 1300 includes mapping low priority CSI-1, including rate matching around the high priority HARQ-ACK/NACK REs and the low priority HARQ-ACK/NACK REs as illustrated at block 1318. Finally, the UL-SCH data is mapped to REs, wherein the mapping includes rate matching around the high priority HARQ-ACK/NACK REs. The low priority HARQ-ACK/NACK REs and the low priority CSI-1 REs as shown at block 1320. Flow then proceeds to the end block from block 1320.

When other UCI are rate matched around high priority HARQ-ACK/NACK, in order to avoid high priority HARQ-ACK/NACK size misalignment, despite its very low probability, which may lead to starting point ambiguity for low priority HARQ-ACK/NACK decoding at a gNB, for example, the above methods in FIGS. 9 and/or 11 may include mapping the low priority HARQ-ACK/NACK information starting at a fixed position in the PUSCH when possible. As one example, the low priority HARQ-ACK/NACK information may be mapped at or in reference to the first OFDM symbol in the PUSCH or the first OFDM symbol after a last DMRS from the gNB.

Furthermore, with regard to the methods of FIGS. 10, 11, and/or 12, as the padding therein involves resource over-provision due to the rounding up or padding of low priority bits, the UE may be further configured to double interpret a beta indicator. For example, if the original low priority HARQ-ACK/NACK bits before rounding up are less than or equal to the X number of bits, the UE may be configured to set a beta_offset=indicated beta_offset by DCI/gamma, where gamma >1 and gamma is a scaling down factor that can be radio resource control (RRC) configured by network, as one example. Alternatively, if the original low priority HARQ-ACK/NACK bits before rounding up is greater than the X bits, the UE may be configured to set beta_offset=indicated beta_offset by DCI.

Figure 14:
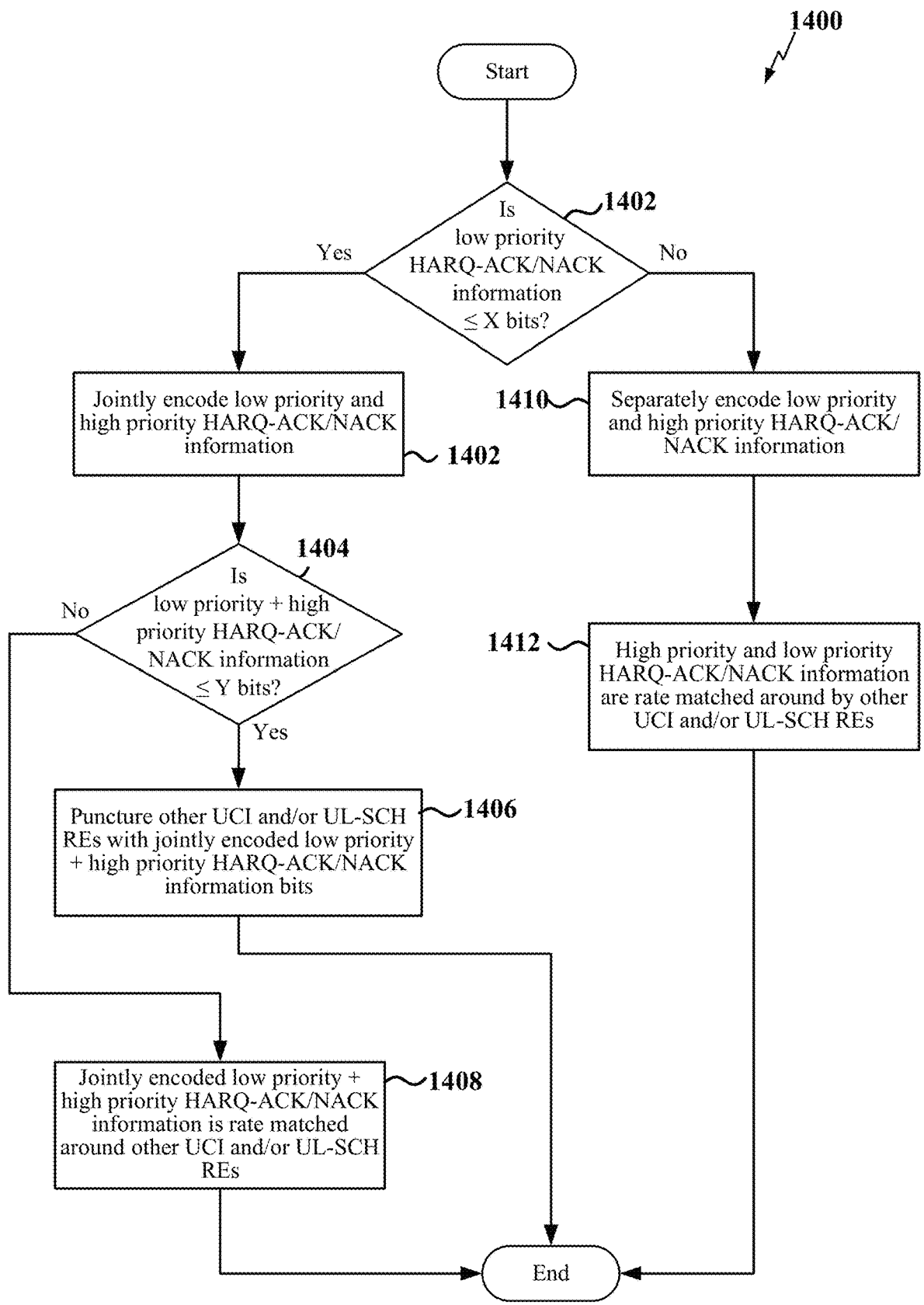
FIG. 14 illustrates a flow diagram of a method of encoding according to some aspects.

In another example, as shown in the method 1400 of FIG. 14, if the low priority HARQ-ACK/NACK information is less than or equal to X bits (e.g., 2 or 3 bits) at a decision block 1402, then the flow follows a yes path to decision block 1402 where the low priority HARQ-ACK/NACK information may be configured to be jointly encoded with high priority HARQ-ACK/NACK information. Otherwise, the flow follows a no path to block 1410, where the low priority and high priority HARQ-ACK/NACK information may be separately encoded. The method 1400 of FIG. 14 may be used for various encoding that may be utilized in the previously discussed systems.

In an aspect, a further determination may be made whether the low priority HARQ-ACK/NACK plus high priority HARQ ACK/NACK (also referred to herein as low priority+high priority HARQ-ACK/NACK) information is less than or equal to Y bits (e.g., 4 bits) as shown by decision block 1404. If yes, then flow proceeds to block 1406 where the joint encoded low priority plus (+) the high priority HARQ-ACK/NACK information may then puncture other UCI and/or UL-SCH REs (PUSCH REs) as shown at block 1406. Flow from block 1406 proceeds to an end block, as shown. Otherwise, if a decision block 1404 it is determined that the low priority plus the high priority HARQ-ACK/NACK information is greater than Y bits, then the jointly encoded low priority+high priority HARQ-ACK/NACK information is rate matched around by other UCI and/or UL-SCH REs as shown at block 1408. Flow from block 1408 proceeds to the end block, as shown.

If low priority HARQ-ACK/NACK is greater than X bits as determined at decision block 1402, then the low priority HARQ-ACK/NACK and high priority HARQ-ACK/NACK information are separately encoded as indicated at block 1410. Additionally, the high priority HARQ-ACK/NACK information and the low priority HARQ-ACK/NACK information are both rate matched around by other UCI and/or UL-SCH REs as shown at block 1412. Flow from block 1412 proceeds to the end block, as shown.

Figure 15:
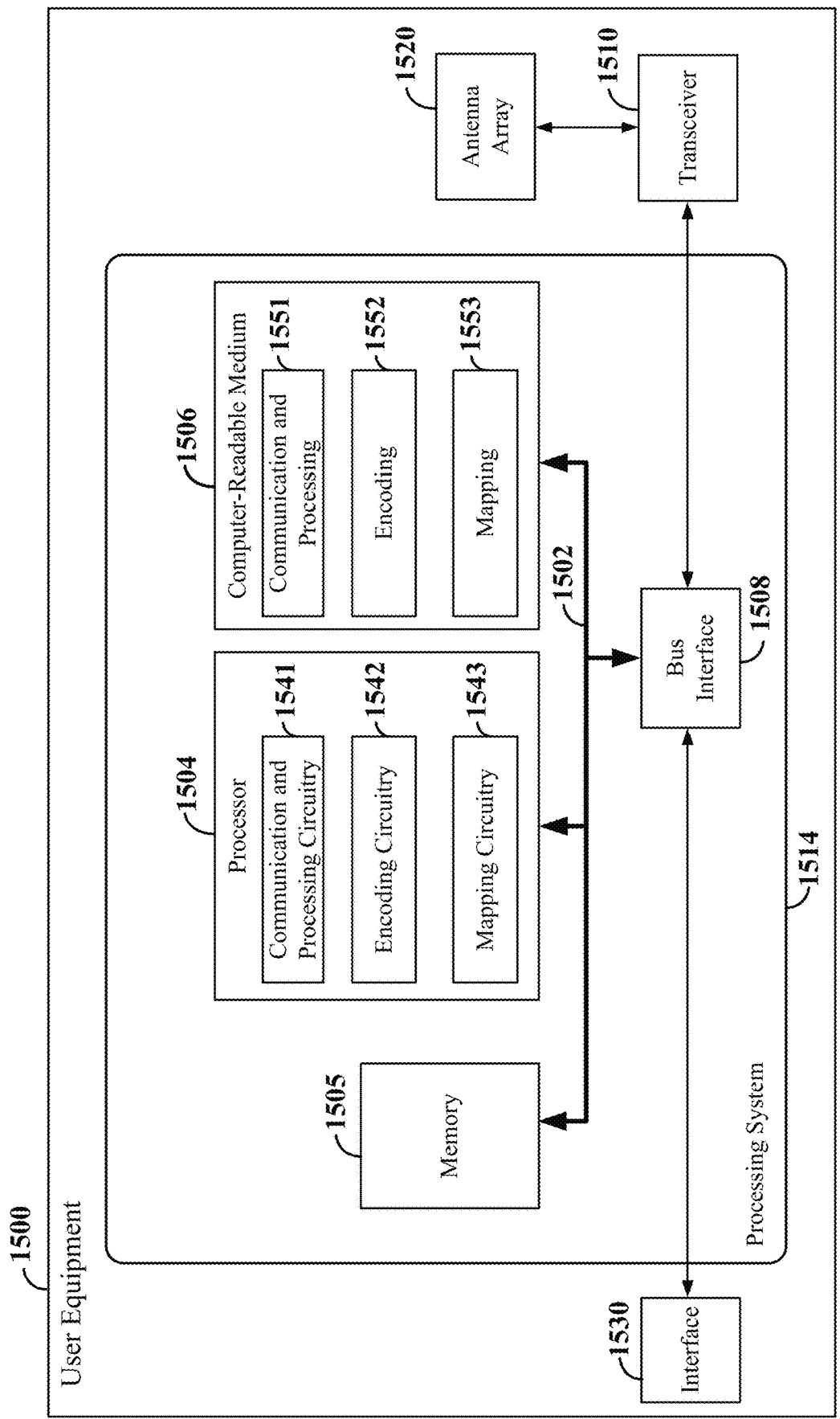
FIG. 15 is a block diagram illustrating an example of a hardware implementation of a network entity such as a user equipment (UE) employing a processing system according to some aspects.

FIG. 15 is a block diagram conceptually illustrating an example of a hardware implementation of a user equipment (UE) employing a processing system 1514 according to some aspects of the disclosure. In accordance with various aspects of the disclosure, an element, or any portion of an element, or any combination of elements may be implemented with a processing system 1514 that includes one or more processors 1504. In some implementations, the UE 1500 may correspond to any of the UEs or scheduled entities shown in any of FIGS. 1, 2, and/or 4 and discussed previously.

The UE 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1500 may be configured to perform any one or more of the functions described herein. That is, the processor 1504, as utilized in a UE 1500, may be used to implement any one or more of the processes and procedures described below.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits, including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510 and between the bus 1502 and an interface 1530. The transceiver 1510 provides a communication interface or means for communicating with various other apparatus over a wireless transmission medium. In some examples, the wireless communication device may include two or more transceivers 1510, each configured to communicate with a respective network type (e.g., terrestrial or non-terrestrial). According to some aspects, the transceiver 1510 may be coupled to an antenna array 1520 and together, the transceiver 1510 and the antenna array 1520 may be configured to communicate with the respective network type. At least one interface 1530 (e.g., a network interface and/or a user interface) provides a communication interface or means for communicating with various other apparatus and devices (e.g., other devices housed within the same apparatus as the UE 1500 or an external apparatus) over an internal bus or via external transmission medium, such as an Ethernet cable.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506.

The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities, including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1500 may be configured to perform any one or more of the operations described herein (e.g., as described above in conjunction with FIGS. 5-14 and as described below in conjunction with FIGS. 16-19). In some aspects of the disclosure, the processor 1504, as utilized in the UE 1500, may include circuitry configured for various functions.

In one aspect, the processor 1504 may include a communication and processing circuitry 1541. The communication and processing circuitry 1541 may include one or more hardware components that provide the physical structure that performs various processes related to wireless communication (e.g., signal reception and/or signal transmission) as described herein. The communication and processing circuitry 1541 may further include one or more hardware components that provide the physical structure that performs various processes related to signal processing (e.g., processing a received signal and/or processing a signal for transmission) as described herein. In some examples, the communication and processing circuitry 1541 may include two or more transmit/receive chains. The communication and processing circuitry 1541 may further be configured to execute communication and processing software 1551 included on the computer-readable medium 1506 to implement one or more functions described herein.

The processor 1504 also includes encoding circuitry 1542 configured to encode UCI and UL-SCH data, such as was illustrated in any of FIG. 5, 7, 8, 10, or 12. The encoding circuitry 1542 may include functionality for encoding any of the high priority or low priority HARQ-ACK/NACK information, low priority CSI-1, or UL-SCH data for subsequent Resource Element (RE) mapping to REs in an uplink transmission (e.g., mapping/multiplexing in a PUSCH). Further, the encoding circuitry 1542 may be configured to implement four encodings using Release 15 encoding equations for respective HARQ ACK/NACK. CSI-1, CSI-2, and UL-SCH data encoding. Additionally, encoding circuitry 1542 may be configured to include padding for low priority HARQ ACK/NACK information in accordance with examples of FIGS. 10-13, for example, or the joint/non-joint encoding discussed in connection with FIG. 14. The encoding circuitry 1542 may further be configured to execute encoding software 1552 included on the computer-readable medium 1506 to implement one or more functions described herein.

The processor 1504 also includes mapping circuitry 1543 configured to map the various high priority and low priority HARQ-ACK/NACK information, low priority CSI-1, and UL-SCH data to REs in uplink transmission resources such as a slot, subframe, or transport block (TB) carrying the PUSCH. The mapping circuitry 1543 may include functionality for mapping according to any of the examples of FIGS. 5-14, for example. The mapping circuitry 1543 may further be configured to execute mapping software 1553 included on the computer-readable medium 1506 to implement one or more functions described herein.

Figure 16:
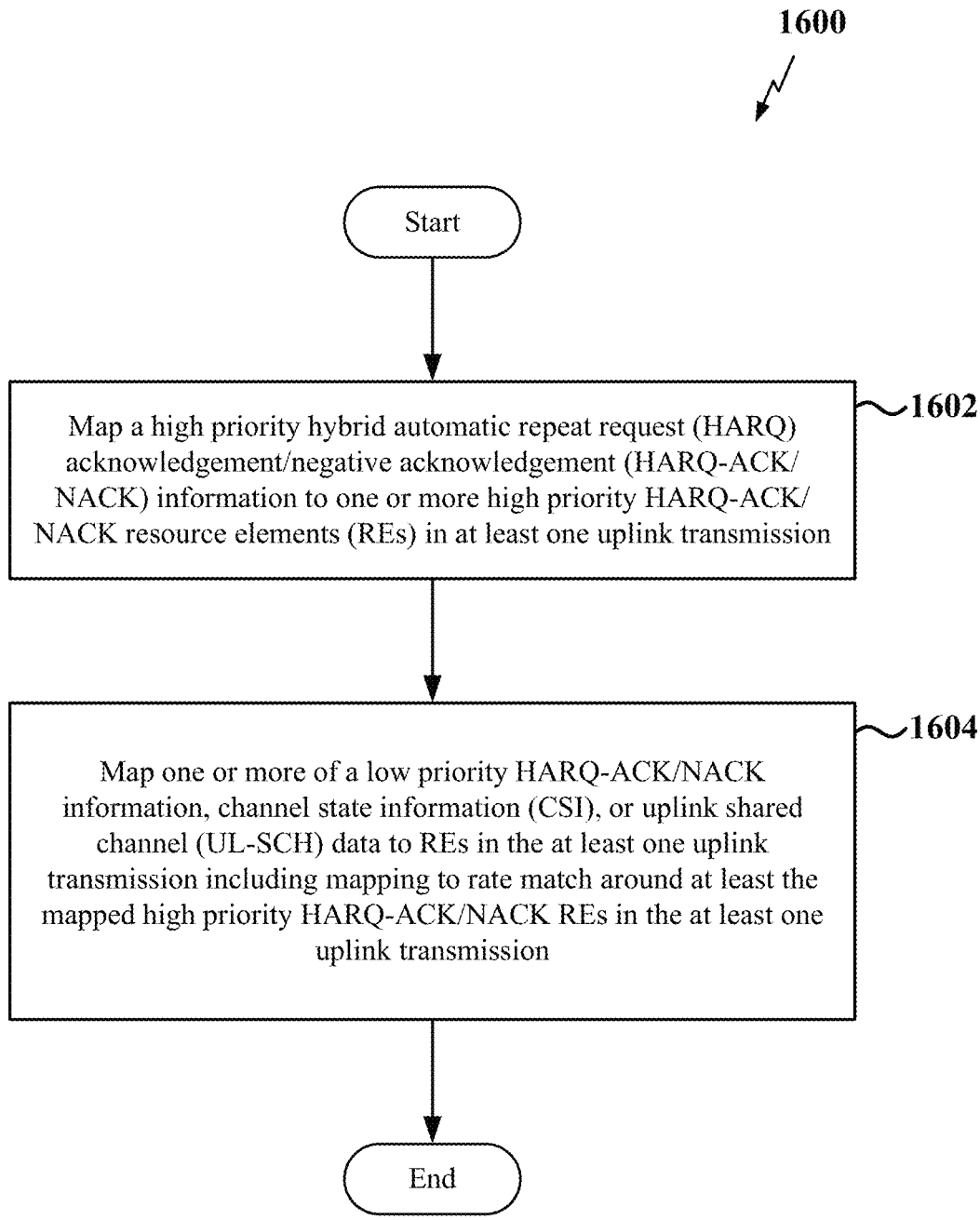
FIG. 16 is a flow diagram illustrating a method of communication at the network entity of FIG. 15 according to some aspects.

FIG. 16 is a flow diagram illustrating an example of a method 1600 of wireless communication that may be implemented at a UE according to some aspects of the disclosure. According to some aspects, the method 1600 of wireless communication may occur in a wireless communication network. As described herein, some or all illustrated features may be omitted in a particular implementation within the scope of the present disclosure, and some illustrated features may not be required for implementation of all examples. In some examples, the method 1600 may be carried out by the UE 1500 illustrated in FIG. 15. In some examples, the method 1600 may be carried out by any suitable apparatus or means for carrying out the functions or algorithm described below.

At block 1602, the UE may map a high priority hybrid automatic repeat request-acknowledgment/negative acknowledgment (HARQ-ACK/NACK) information to one or more high priority HARQ-ACK/NACK resource elements (REs) in an uplink transmission. In an aspect, the processes of block 1602 may be implemented by a means for mapping the high priority HARQ-ACK/NACK information, which may be implemented by processor 1504, and mapping circuitry 1543, and may further include aspects of communication and processing circuitry 1541, and/or transceiver 1510, or equivalents thereof.

Further, at block 1604, the UE may map one or more of a low priority HARQ-ACK/NACK information, channel state information (CSI) (e.g., CSI-1, CSI-2), or uplink-shared channel (UL-SCH) data to REs in the uplink transmission, including mapping to rate match around the mapped one or more high priority HARQ-ACK/NACK REs in the uplink transmission. According to some aspects, the CSI may be low priority part 1 CSI (low priority CSI-1). In one aspect, the processes of block 1604 may be implemented by a means for mapping, which may be implemented by processor 1504, and mapping circuitry 1543, and may further include aspects of communication and processing circuitry 1541, and/or transceiver 1510, or equivalents thereof.

In the method 1600, mapping the low priority HARQ-ACK/NACK information may include mapping the low priority HARQ-ACK/NACK information to reserved REs in response to determining that the size of the low priority HARQ-ACK/NACK information is less than or equal to a predetermined number of bits. The reserved REs may be configured to be rate matched around the mapped high priority HARQ-ACK/NACK REs.

Additionally, method 1600 may include mapping the CSI to CSI REs to rate match around the mapped one or more high priority HARQ-ACK/NACK REs and the reserved REs, and mapping the UL-SCH data to UL-SCH REs, including rate matching around the mapped one or more high priority HARQ-ACK/NACK REs and the CSI REs in the uplink transmission prior to mapping the low priority HARQ-ACK/NACK information, including ignoring the reserved REs. Further, mapping the low priority HARQ-ACK/NACK information to the reserved REs may include puncturing UL-SCH data mapped to one or more of the reserved REs.

Method 1600 may still further include that mapping the one or more of the low priority HARQ-ACK/NACK information, the CSI, or the UL-SCH data to REs in the uplink transmission may be in response to determining that a size of the low priority HARQ-ACK/NACK information is greater than a predetermined number of bits. The mapping may include mapping the low priority HARQ-ACK/NACK information to low priority HARQ-ACK/NACK REs, including rate matching around the mapped one or more high priority HARQ-ACK/NACK REs, mapping the CSI to CSI REs, including rate matching around the mapped one or more high priority HARQ-ACK/NACK REs and the mapped low priority HARQ-ACK/NACK REs in the uplink transmission, and mapping the UL-SCH data to UL-SCH REs, including rate matching around the mapped one or more high priority HARQ-ACK/NACK REs, the mapped low priority HARQ-ACK/NACK REs, and the mapped CSI REs in the uplink transmission.

In other aspects, method 1600 may include padding the low priority HARQ-ACK/NACK information to a predetermined number of bits in response to determining that a size of the low priority HARQ-ACK/NACK information is less than or equal to the predetermined number of bits, encoding the padded low priority HARQ-ACK/NACK information, and mapping the encoded padded low priority HARQ-ACK/NACK information to encoded padded low priority HARQ-ACK/NACK REs, including rate matching around the mapped one or more high priority HARQ-ACK/NACK REs in the uplink transmission. In yet other aspects, the low priority HARQ-ACK/NACK information may be padded with dummy NACKs.

In another aspect, method 1600 may include mapping the CSI to CSI REs, including rate matching around the mapped one or more high priority HARQ-ACK/NACK REs and the mapped encoded padded low priority HARQ-ACK/NACK REs in the uplink transmission, and mapping the UL-SCH data to UL-SCH REs, including rate matching around the mapped one or more high priority HARQ-ACK/NACK REs, the mapped encoded padded low priority HARQ-ACK/NACK REs, and the mapped CSI REs in the uplink transmission.

In yet other aspects, in response to determining that the size of the low priority HARQ-ACK/NACK information is greater than the predetermined number of bits, the UE may avoid padding the low priority HARQ-ACK/NACK information and the method may further include mapping the low priority HARQ-ACK/NACK information to low priority HARQ-ACK/NACK REs, including rate matching around the mapped one or more high priority HARQ-ACK/NACK REs in the uplink transmission, mapping the CSI to CSI REs, including rate matching around the mapped one or more high priority HARQ-ACK/NACK REs and the mapped low priority HARQ-ACK/NACK REs in the uplink transmission, and mapping the UL-SCH data to UL-SCH REs, including rate matching around the mapped one or more high priority HARQ-ACK/NACK REs, the mapped low priority HARQ-ACK/NACK REs. and the mapped CSI REs in the uplink transmission. In accordance with some aspects, the mapped low priority HARQ-ACK/NACK information may be padded with dummy NACKs.

In another aspect, method 1600 includes reserving REs for the high priority HARQ-ACK/NACK information in response to determining that a first size of the high priority HARQ-ACK/NACK information is less than or equal to a first predetermined number of bits, padding the low priority HARQ-ACK/NACK information to a second predetermined number of bits in response to determining that a second size of the low priority HARQ-ACK/NACK information is less than the second predetermined number of bits, and avoiding padding the low priority HARQ-ACK/NACK information in response to determining that the second size of the low priority HARQ-ACK/NACK information is greater than or equal to the second predetermined number of bits, and mapping the low priority HARQ-ACK/NACK information to low priority HARQ-ACK/NACK REs, including rate matching around reserved REs for the high priority HARQ-ACK/NACK information in the uplink transmission. According to some aspects, the low priority HARQ-ACK/NACK information may be encoded, and the encoded low priority HARQ-ACK/NACK information that is mapped to REs may be rate matched around reserved REs for the high priority HARQ-ACK/NACK information in the uplink transmission. In some aspects, the method 1600 may further include mapping the CSI to CSI REs, including rate matching around the mapped low priority HARQ-ACK/NACK REs and ignoring the reserved REs for the high priority HARQ-ACK/NACK information in the uplink transmission. The method 1600 may still further include mapping the UL-SCH data to UL-SCH REs, including rate matching around at least the mapped low priority HARQ-ACK/NACK REs and the mapped CSI REs and ignoring the reserved REs for the high priority HARQ-ACK/NACK information in the uplink transmission, and mapping the high priority HARQ-ACK/NACK information to the reserved REs, including puncturing one or more CSI REs, UL-SCH REs, or both CSI REs and UL-SCH REs.

Yet further, method 1600 may include avoiding reserving REs for the high priority HARQ-ACK/NACK information in response to determining that the first size of the high priority HARQ-ACK/NACK information is greater than the first predetermined number of bits, padding the low priority HARQ-ACK/NACK information to the second predetermined number of bits in response to determining that the second size of the low priority HARQ-ACK/NACK information is less than the second predetermined number of bits, and avoiding padding the low priority HARQ-ACK/NACK information in response to determining that the second size of the low priority HARQ-ACK/NACK information is greater than or equal to the second predetermined number of bits. Additionally, the method 1600 may also include encoding the low priority HARQ-ACK/NACK information. Additionally, the method 1600 may include mapping the high priority HARQ-ACK/NACK information to high priority HARQ-ACK/NACK REs in the uplink transmission, mapping the low priority HARQ-ACK/NACK information to low priority HARQ-ACK/NACK REs, including rate matching around the mapped one or more high priority HARQ-ACK/NACK REs in the uplink transmission, mapping the CSI to CSI REs, including rate matching around the mapped one or more high priority HARQ-ACK/NACK REs and the mapped low priority HARQ-ACK/NACK REs in the uplink transmission, and mapping the UL-SCH data to UL-SCH REs, including rate matching around the mapped one or more high priority HARQ-ACK/NACK REs, the mapped low priority HARQ-ACK/NACK REs, and the mapped CSI REs in the uplink transmission.

In yet other aspects, method 1600 may include mapping the low priority HARQ-ACK/NACK information starting at a fixed position within time and frequency resources of a physical uplink shared channel (PUSCH) carrying the UL-SCH data. The fixed position may be, for example, a first symbol in the PUSCH or a first symbol occurring after a received demodulation reference signal (DMRS) in the time and frequency resources.

In other aspects where padding of the low priority HARQ-ACK/NACK information is utilized, the method 1600 may include setting a beta_offset equal to a quotient of an indicated beta_offset indicated by received downlink control information (DCI) and a scaling factor (gamma), where the scaling factor is greater than one when the number of low priority HARQ-ACK/NACK information bits is less than the second predetermined number of bits. Further, the method 1600 may include setting a beta_offset equal to an indicated beta_offset indicated by received downlink control information (DCI) when the number of low priority HARQ-ACK/NACK information bits is greater than or equal to the second predetermined number of bits.

Figure 17:
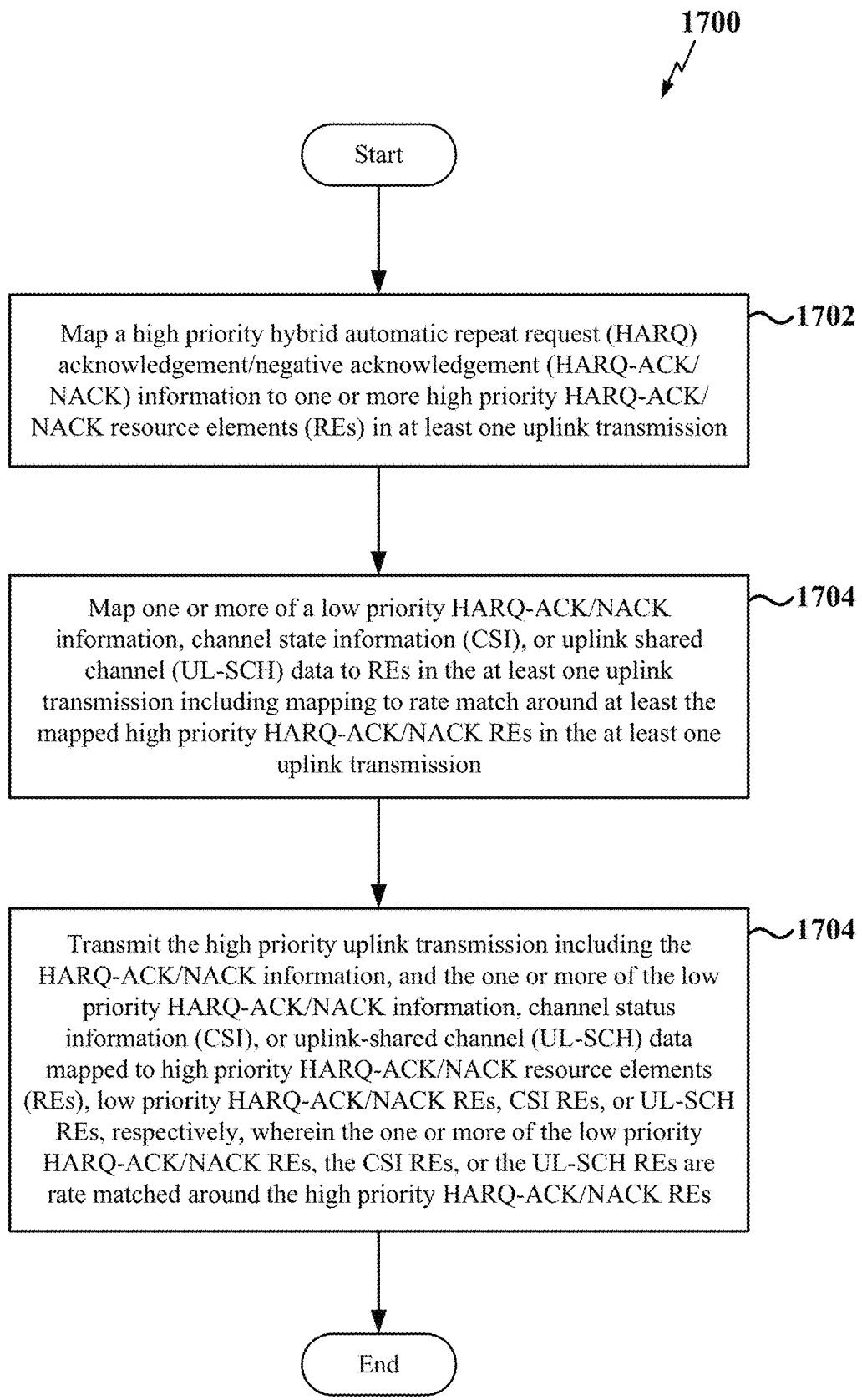
FIG. 17 is a flow diagram illustrating a method of communication at the network entity of FIG. 15 according to some aspects.

FIG. 17 is a flow diagram illustrating an example of a method 1700 of wireless communication that may be implemented at a UE according to some aspects of the disclosure. According to some aspects, the method 1700 of wireless communication may occur in a wireless communication network. As described herein, some or all illustrated features may be omitted in a particular implementation within the scope of the present disclosure, and some illustrated features may not be required for implementation of all examples. In some examples, the method 1700 may be carried out by the UE 1500 illustrated in FIG. 15. In some examples, the method 1700 may be carried out by any suitable apparatus or means for carrying out the functions or algorithm described below.

Similar to block 1602 of FIG. 16, at block 1702 the UE may map a high priority hybrid automatic repeat request-acknowledgment/negative acknowledgment (HARQ-ACK/NACK) information to one or more high priority HARQ-ACK/NACK resource elements (REs) in an uplink transmission. In an aspect, the processes of block 1702 may be implemented by a means for mapping the high priority HARQ-ACK/NACK information, which may be implemented by processor 1504, and mapping circuitry 1543, and may further include aspects of communication and processing circuitry 1541, and/or transceiver 1510, or equivalents thereof.

Further, and similar to block 1604 of FIG. 6, at block 1704, the UE may map one or more of a low priority HARQ-ACK/NACK information, channel state information (CSI) (e.g., CSI-1, CSI-2), or uplink-shared channel (UL-SCH) data to REs in the uplink transmission, including mapping to rate match around the mapped one or more high priority HARQ-ACK/NACK REs in the uplink transmission. According to some aspects, the CSI may be low priority part 1 CSI (low priority CSI-1). In one aspect, the processes of block 1704 may be implemented by a means for mapping, which may be implemented by processor 1504, and mapping circuitry 1543, and may further include aspects of communication and processing circuitry 1541, and/or transceiver 1510, or equivalents thereof.

At block 1706, the UE may transmit the high priority uplink transmission, including the HARQ-ACK/NACK information, and the one or more of the low priority HARQ-ACK/NACK information, channel status information (CSI), or uplink-shared channel (UL-SCH) data mapped to high priority HARQ-ACK/NACK resource elements (REs), low priority HARQ-ACK/NACK REs, CSI REs, or UL-SCH REs, respectively, wherein the one or more of the low priority HARQ-ACK/NACK REs, the CSI REs, or the UL-SCH REs are rate matched around the high priority HARQ-ACK/NACK REs. In one aspect, the processes of block 1706 may be implemented by a means for transmitting, which may be implemented by processor 1504, transceiver 1510, may further include aspects of communication and processing circuitry 1541 or equivalents thereof.

Figure 18:
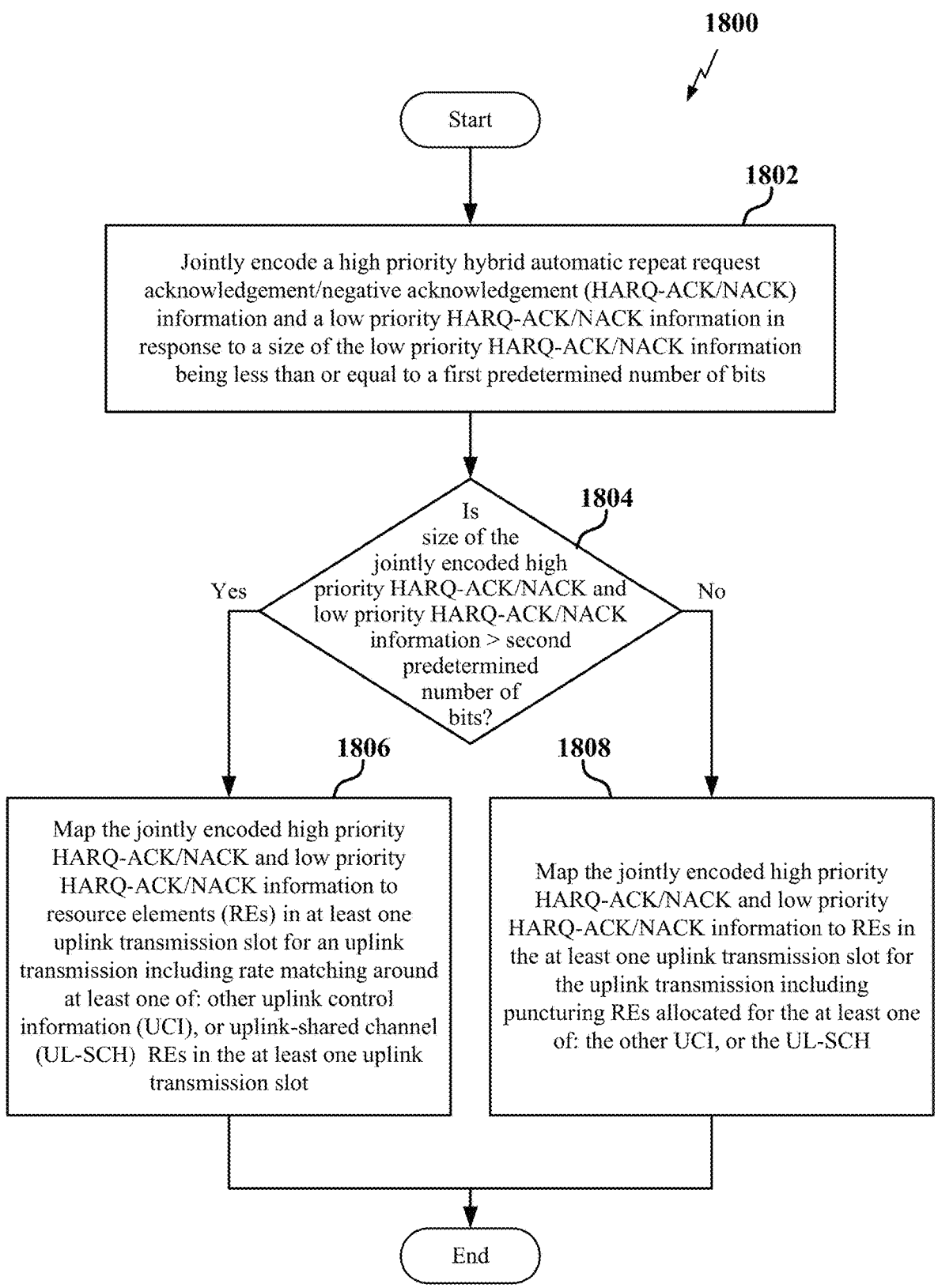
FIG. 18 is a flow diagram illustrating a method of communication at the network entity of FIG. 15 according to some aspects.

FIG. 18 is a flow diagram illustrating an example of a method 1800 of wireless communication that may be implemented at a UE according to some aspects of the disclosure. According to some aspects, the method 1800 of wireless communication may occur in a wireless communication network. As described herein, some or all illustrated features may be omitted in a particular implementation within the scope of the present disclosure, and some illustrated features may not be required for implementation of all examples. In some examples, the method 1800 may be carried out by the UE 1500 illustrated in FIG. 15. In some examples, the method 1800 may be carried out by any suitable apparatus or means for carrying out the functions or algorithm described below.

At block 1802, the UE may jointly encode a high priority hybrid automatic repeat request-acknowledgment/negative acknowledgment (HARQ-ACK/NACK) information and a low priority HARQ-ACK/NACK information in response to a size of the low priority HARQ-ACK/NACK information being less than or equal to a first predetermined number of bits. In an aspect, the processes of block 1802 may be implemented by a means for jointly encoding a high priority hybrid automatic repeat request-acknowledgment/negative acknowledgment (HARQ-ACK/NACK) information and a low priority HARQ-ACK/NACK information, which may be implemented by processor 1504, and encoding circuitry 1542, and may further include aspects of communication and processing circuitry 1541, and/or transceiver 1510, or equivalents thereof.

At block 1802, the UE may determine if a size of the jointly encoded high priority HARQ-ACK/NACK and low priority HARQ-ACK/NACK information is greater than a second predetermined number. If the size of the jointly encoded high priority HARQ-ACK/NACK and low priority HARQ-ACK/NACK information is greater than a second predetermined number, then the method 1800 proceeds to block 1806.

At block 1806, the UE may map the jointly encoded high priority HARQ-ACK/NACK and low priority HARQ-ACK/NACK information to resource elements (REs) in an uplink transmission slot for an uplink transmission, including rate matching around at least one of other uplink control information (UCI) or UL-SCH REs in the uplink transmission slot in response to the size of the jointly encoded high priority HARQ-ACK/NACK and low priority HARQ-ACK/NACK information being greater than a second predetermined number of bits. Thereafter, the method 1800 may proceed to an end block.

Returning to block 1802, if the UE determines that the size of the jointly encoded high priority HARQ-ACK/NACK and low priority HARQ-ACK/NACK information is less than or equal to the second predetermined number, then the method 1800 proceeds to block 1808.

At block 1808, the UE may map the jointly encoded high priority HARQ-ACK/NACK and low priority HARQ-ACK/NACK information to low priority HARQ-ACK/NACK REs in the uplink transmission slot for the uplink transmission, including puncturing REs allocated for the at least one of the other UCI or UL-SCH in response to the size of the number of bits of the jointly encoded high priority HARQ-ACK/NACK and low priority HARQ-ACK/NACK information being less than or equal to the second predetermined number of bits. Thereafter, the method 1800 may proceed to the end block.

Figure 19:
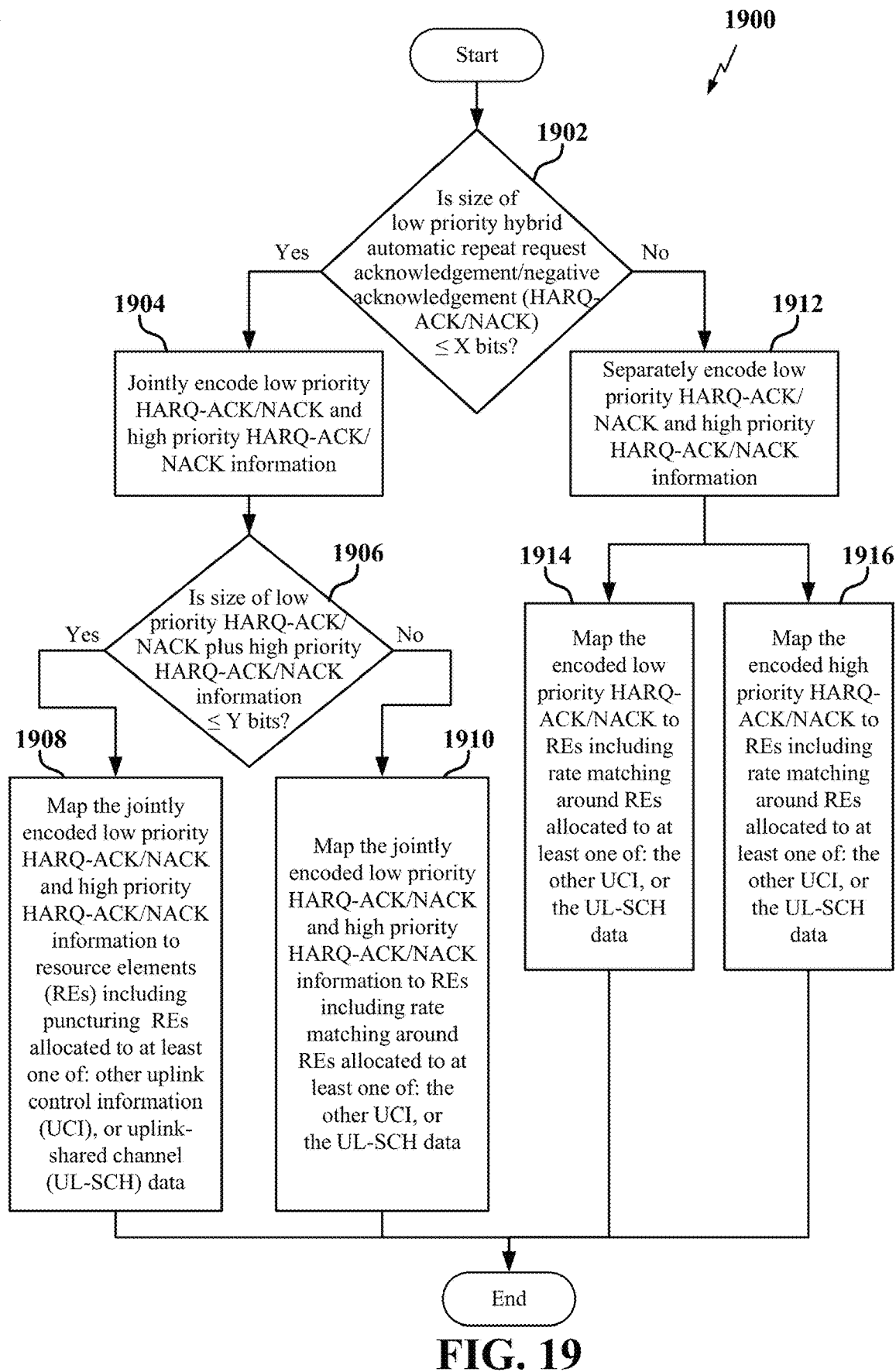
FIG. 19 is a flow diagram illustrating a method of communication at the network entity of FIG. 15 according to some aspects.

FIG. 19 is a flow diagram illustrating an example of a method 1900 of wireless communication that may be implemented at a UE according to some aspects of the disclosure. According to some aspects, the method 1900 of wireless communication may occur in a wireless communication network. As described herein, some or all illustrated features may be omitted in a particular implementation within the scope of the present disclosure, and some illustrated features may not be required for the implementation of all examples. In some examples, the method 1900 may be carried out by the UE 1500 illustrated in FIG. 15. In some examples, the method 1900 may be carried out by any suitable apparatus or means for carrying out the functions or algorithm described below.

At decision block 1902, the UE may determine if a size of low priority hybrid automatic repeat request-acknowledgment/negative acknowledgment (HARQ-ACK/NACK)≤X bits (e.g., less than or equal to a first number of bits, less than or equal to 2 bits). For example, the communication and processing circuitry 1541, as shown and described in FIG. 15, may provide a means for determining if a size of low priority hybrid automatic repeat request-acknowledgment/negative acknowledgment (HARQ-ACK/NACK)≤X bits.

At block 1904, in response to determining that the size of the low priority HARQ-ACK/NACK≤X bits, the UE may jointly encode the low priority HARQ-ACK/NACK and high priority HARQ-ACK/NACK information. For example, the encoding circuitry 1542, as shown and described in connection with FIG. 15, may provide a means for jointly encoding the low priority HARQ-ACK/NACK and high priority HARQ-ACK/NACK information.

Thereafter, at decision block 1906, the UE may determine if a size of the low priority HARQ-ACK/NACK plus a size of the high priority HARQ-ACK/NACK is ≤Y bits (e.g., less than or equal to a second predetermined number of bits, less than or equal to 4 bits). For example, the communication and processing circuitry 1541 as shown and described in FIG. 15, may provide a means for determining if a size of the low priority HARQ-ACK/NACK plus a size of the high priority HARQ-ACK/NACK is 5 Y bits.

In response to determining that the size of the low priority HARQ-ACK/NACK plus the size of the high priority HARQ-ACK/NACK is S Y bits, the UE may, at block 1908, map the jointly encoded low priority HARQ-ACK/NACK and high priority HARQ-ACK/NACK information to REs (e.g., jointly encoded low priority HARQ-ACK/NACK and high priority HARQ-ACK/NACK REs), including puncturing resource elements (REs) allocated to at least one of: other uplink control information (UCI), or uplink-shared channel (UL-SCH) data. For example, the mapping circuitry 1543, as shown and described in FIG. 15, may provide a means for mapping the jointly encoded low priority HARQ-ACK/NACK and high priority HARQ-ACK/NACK information to REs (e.g., jointly encoded low priority HARQ-ACK/NACK and high priority HARQ-ACK/NACK REs), including puncturing resource elements (REs) allocated to at least one of: other uplink control information (UCI), or uplink-shared channel (UL-SCH) data.

Returning to decision block 1906, in response to the UE determining that the size of the low priority HARQ-ACK/NACK plus the size of the high priority HARQ-ACK/NACK is not ≤Y bits (i.e., the sum of the sizes is >Y bits), the UE may, at block 1910, map the jointly encoded low priority HARQ-ACK/NACK and high priority HARQ-ACK/NACK information to resource REs, including rate matching around at least one of: the other UCI, or UL-SCH data. For example, the mapping circuitry 1543, as shown and described in FIG. 15, may provide a means for mapping the jointly encoded low priority HARQ-ACK/NACK and high priority HARQ-ACK/NACK information to resource REs, including rate matching around at least one of: the other UCI, or UL-SCH data.

Returning to decision block 1902, in response to the UE determining that the size of the low priority HARQ-ACK/NACK is not ≤X (i.e., the size of the low priority HARQ ACK/NACK is >X bits), the UE may, at block 1912, separately encode the low priority HARQ-ACK/NACK and the high priority HARQ-ACK/NACK information. For example, the encoding circuitry 1542, as shown and described in connection with FIG. 15, may provide a means for separately encoding the low priority HARQ-ACK/NACK and the high priority HARQ-ACK/NACK information.

Thereafter, at block 1914, the UE may map the encoded low priority HARQ-ACK/NACK information to low priority HARQ-ACK/NACK REs, including rate matching around at least one of: other UCI, or UL-SCH data. Also following block 1912, at block 1916, the UE may map the encoded high priority HARQ-ACK/NACK information to encoded high priority HARQ-ACK/NACK REs, including rate matching around at least one of: other UCI, or UL-SCH data. In FIG. 19, block 1914 and block 1916 are shown in parallel for ease of illustration and not limitation. Block 1914 and block 1916 may occur in any order or may occur simultaneously. For example, the mapping circuitry 1543, as shown and described in connection with FIG. 15, may provide a means for mapping the encoded low priority HARQ-ACK/NACK information to low priority HARQ-ACK/NACK REs, including rate matching around at least one of: other UCI, or UL-SCH data and a means for mapping the encoded high priority HARQ-ACK/NACK information to encoded high priority HARQ-ACK/NACK REs, including rate matching around at least one of: other UCI, or UL-SCH data. Following completion of block 1908 or block 1910, or following completion of both block 1914 and block 1916, the method 1900 may end.

Figure 20:
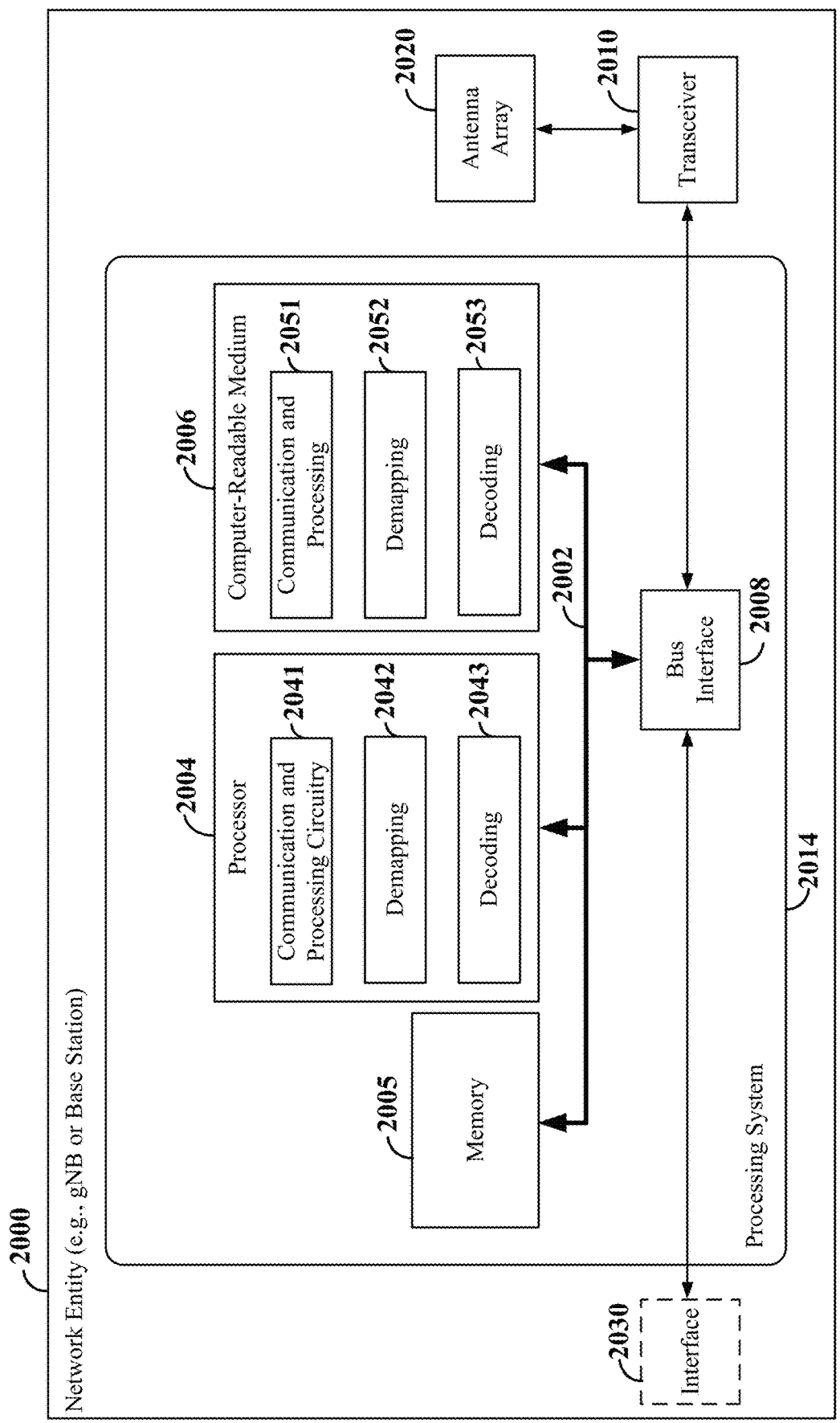
FIG. 20 is a block diagram illustrating an example of a hardware implementation of a network entity such as a base station, gNB, or mobility element of a network, employing a processing system according to some aspects.

FIG. 20 is a block diagram conceptually illustrating an example of a hardware implementation for a network node or network entity 2000 (hereinafter the network entity 2000) employing a processing system 2014 according to some aspects of the disclosure. In accordance with various aspects of the disclosure, an element, or any portion of an element, or any combination of elements may be implemented with a processing system 2014 that includes one or more processors 2004. In some implementations, the network entity 2000 may correspond to any of the BSs (e.g., gNBs, eNBs, etc.) or scheduling entities shown in either of FIGS. 1, 2, and/or 4. In some examples, the network entity 2000 may be implemented as an aggregated base station or a disaggregated base station. In a disaggregated base station architecture, the network entity 2000 may include one or more of a central unit (CU) (e.g., CU 410 as shown and described in connection with FIG. 4), a distributed unit (DU) (e.g., DU 430 as shown and described in connection with FIG. 4), or a radio unit (RU) (e.g., RU 440 as shown and described in connection with FIG. 4).

The network entity 2000 may be implemented with a processing system 2014 that includes one or more processors 2004. Examples of processors 2004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network entity 2000 may be configured to perform any one or more of the functions described herein. That is, the processor 2004, as utilized in network entity 2000, may be used to implement any one or more of the processes and procedures described herein.

In this example, the processing system 2014 may be implemented with a bus architecture, represented generally by the bus 2002. The bus 2002 may include any number of interconnecting buses and bridges depending on the specific application of the processing system 2014 and the overall design constraints. The bus 2002 communicatively couples together various circuits, including one or more processors (represented generally by the processor 2004), a memory 2005, and computer-readable media (represented generally by the computer-readable medium 2006). The bus 2002 may also link various other circuits such as timing sources, peripherals, voltage regulators, and power management circuits, which are well known in the art, and, therefore, will not be described any further. A bus interface 2008 provides an interface between the bus 2002 and a transceiver 2010 and between the bus 2002 and an interface 2030 (if provided). The transceiver 2010 provides a communication interface or means for communicating with various other apparatus over a wireless transmission medium. According to some aspects, the transceiver 2010 may be coupled to an antenna array 2020, and together, the transceiver 2010 and the antenna array 2020 may be configured to communicate with the respective network type. The interface 2030 (e.g., a network interface and/or a user interface) may provide a communication interface or means for communicating with various other apparatus and devices (e.g., other devices housed within the same apparatus as the network entity 2000 or an external apparatus) over an internal bus or external transmission medium, such as an Ethernet cable.

The processor 2004 is responsible for managing the bus 2002 and general processing, including the execution of software stored on the computer-readable medium 2006. The software, when executed by the processor 2004, causes the processing system 2014 to perform the various functions described below for any particular apparatus. The computer-readable medium 2006 and the memory 2005 may also be used for storing data that is manipulated by the processor 2004 when executing software.

One or more processors 2004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 2006.

The computer-readable medium 2006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1906 may reside in the processing system 1914, external to the processing system 1914, or distributed across multiple entities, including the processing system 1914. The computer-readable medium 1906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The network entity 2000 may be configured to perform any one or more of the operations described herein (e.g., as described above in conjunction with FIGS. 5-14 and as described below in conjunction with FIG. 21). In some aspects of the disclosure, the processor 2004, as utilized in the network entity 2000, may include circuitry configured for various functions.

The processor 2004 may be configured to generate, schedule, and modify a resource assignment or grant of time-frequency resources (e.g., a set of one or more resource elements). For example, the processor 2004 may schedule time-frequency resources within a plurality of time division duplex (TDD) and/or frequency division duplex (FDD) subframes, slots, and/or mini-slots to carry user data traffic and/or control information to and/or from multiple UEs.

The processor 2004 may be configured to schedule resources for the transmission of downlink reference signals (e.g., SSBs or CSI-RSs) or DCI (or SRS triggering) on a plurality of downlink beams for a downlink beam sweep in accordance with a selected downlink beam sweep type and a selected number of downlink reference signal resources indicated in a request for uplink beam refinement received from a UE. The processor 2004 may further be configured to schedule resources for the uplink transmission of uplink reference signals (e.g., SRSs) on a plurality of uplink beams for an uplink beam sweep in accordance with a selected beam sweep type and selected number of uplink reference signal resources indicated in the request. The processor 2004 may further be configured to schedule resources that the UE may utilize to transmit the request. For example, the uplink beam refinement request resources may include resources scheduled for transmission of a PUCCH, PUSCH, physical random access channel (PRACH) occasion, or RRC message. In some examples, the processor 2004 may be configured to schedule PUSCH resources for the uplink beam refinement request in response to receiving a scheduling request from the UE.

The processor 2004 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

The processor 2004 may include communication and processing circuitry 2041. The communication and processing circuitry 2041 may include one or more hardware components that provide the physical structure that performs various processes related to communication (e.g., signal reception and/or signal transmission) as described herein. The communication and processing circuitry 2041 may further include one or more hardware components that provide the physical structure that performs various processes related to signal processing (e.g., processing a received signal and/or processing a signal for transmission) as described herein. In some examples, the communication and processing circuitry 2041 may include two or more transmit/receive chains. The communication and processing circuitry 2041 may further be configured to execute communication and processing software 2051 included on the computer-readable medium 2006 to implement one or more functions described herein.

In some other examples, the communication and processing circuitry 2041 may be configured to communicate higher layer information such as RRC configuration information to a UE. For example, the communication and processing circuitry 2041 may communicate RRC parameters to UEs, including the gamma or scaling value discussed before.

The processor 2004 may further include demapping circuitry 2042 configured to receive and demap or demultiplex the mapped REs in UL transmissions, including PUSCH transmissions, including mapped or multiplexed high priority and low priority HARQ-ACK/NACK information. CSI (e.g., CSI-1, CSI-2), and UL-SCH data. The demapping circuitry 2042 may further be configured to execute demapping software 2052 included on the computer-readable medium 2006 to implement one or more functions described herein.

In some further examples, the processor 2004 may further include decoding circuitry 2043, which is configured to decode or interpret the high priority and low priority HARQ-ACK/NACK information. CSI, and the UL-SCH data. The decoding circuitry 2043 may further be configured to execute decoding software 2053 included on the computer-readable medium 2006 to implement one or more functions described herein.

Figure 21:
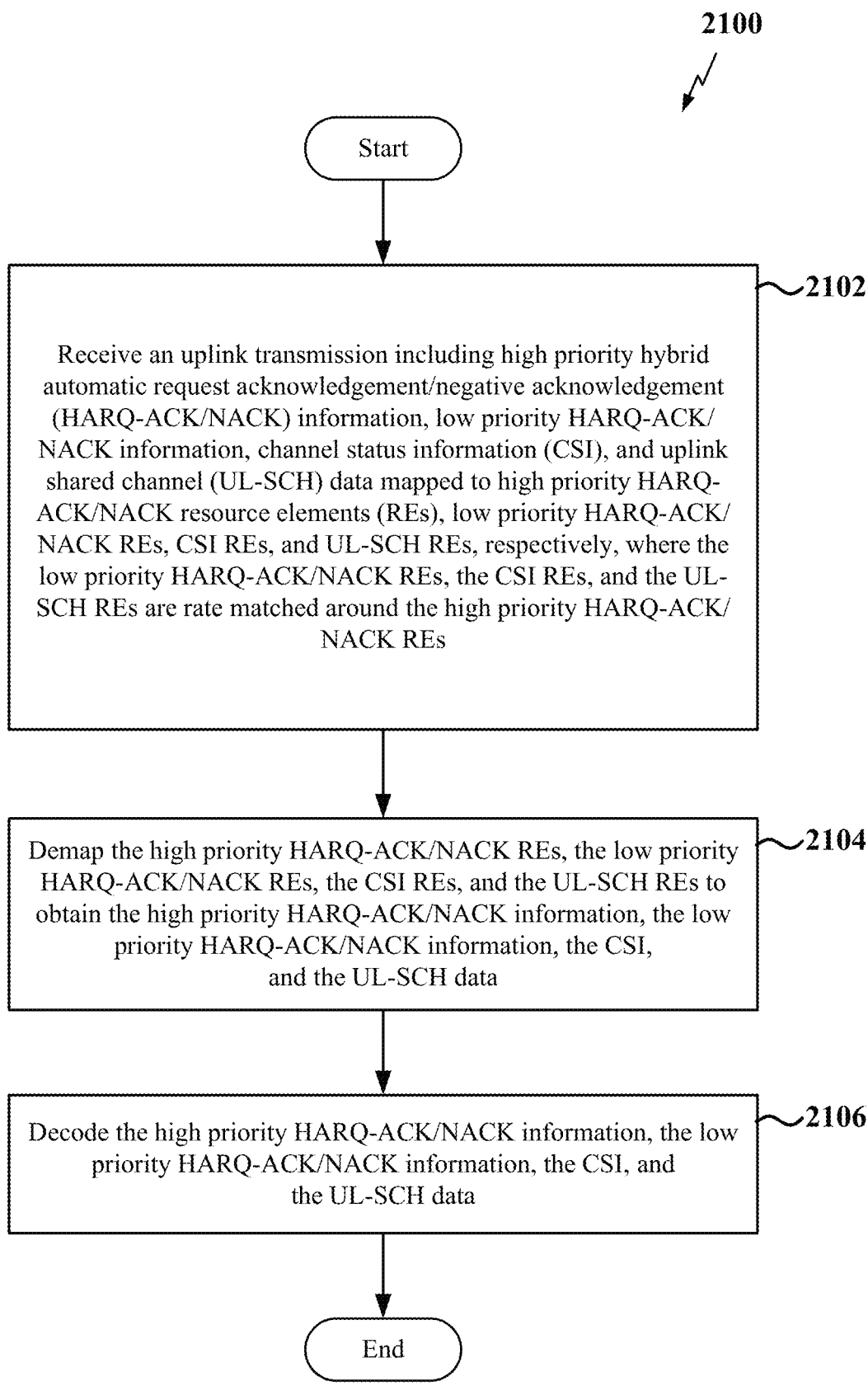
FIG. 21 is a flow diagram illustrating a method for communication at the network entity of FIG. 18 according to some aspects.

FIG. 21 is a flow diagram illustrating an example of a method 2100 of communication that may be implemented at a network entity according to some aspects of the disclosure. According to some aspects, the method 2100 of communication may occur in a wireless communication network. As described herein, some or all illustrated features may be omitted in a particular implementation within the scope of the present disclosure, and some illustrated features may not be required for the implementation of all examples. In some examples, the method 2100 may be carried out by the network entity 1900 (e.g., a gNB, base station, mobility element of the network) illustrated in FIG. 19. In some examples, the method 2100 may be carried out by any suitable apparatus or means for carrying out the functions or algorithm described below.

At block 2102, the method 2100 may include receiving, from a user equipment (UE), an uplink transmission, including high priority hybrid automatic repeat request-acknowledgment/negative acknowledgment (HARQ-ACK/NACK) information, low priority HARQ-ACK/NACK information, CSI (e.g., CSI-1, CSI-2), and uplink-shared channel (UL-SCH) data mapped to high priority HARQ-ACK/NACK resource elements (REs), low priority HARQ-ACK/NACK REs, CSI REs, and UL-SCH REs, respectively, where the low priority HARQ-ACK/NACK REs, the CSI REs, and the UL-SCH REs are rate matched around the high priority HARQ-ACK/NACK REs. According to some aspects, the CSI may be low priority part 1 CSI (low priority CSI-1). In other words, the method 2100 may include receiving, from a UE, a PUSCH, including mapped REs with high priority and low priority HARQ-ACK/NACK information, as well as CSI and UL-SCH data, where the REs are mapped based on all information in the PUSCH being rate matched around the high priority HARQ-ACK/NACK REs. By way of example and not limitation, the communication and processing circuitry 1941, in combination with the transceiver 1910 and antenna array 1920, may provide a means for receiving, from a user equipment (UE), an uplink transmission, including high priority hybrid automatic repeat request-acknowledgment/negative acknowledgment (HARQ-ACK/NACK)

information, low priority HARQ-ACK/NACK information. CSI, and uplink-shared channel (UL-SCH) data mapped to high priority HARQ-ACK/NACK resource elements (REs), low priority HARQ-ACK/NACK REs. CSI REs, and UL-SCH REs, respectively, where the low priority HARQ-ACK/NACK REs, the CSI REs, and the UL-SCH REs are rate matched around the high priority HARQ-ACK/NACK REs. In some examples, in response to a size of the low priority HARQ-ACK/NACK information being less than or equal to a predetermined number of bits, the low priority HARQ-ACK/NACK information is mapped to reserved REs. In some examples, in response to a size of the low priority HARQ-ACK/NACK information being greater than a predetermined number of bits: the low priority HARQ-ACK/NACK information is mapped to REs to rate match around the mapped one or more high priority HARQ-ACK/NACK REs in the uplink transmission, the CSI is mapped to REs to rate matched around the mapped one or more high priority HARQ-ACK/NACK REs and the mapped low priority HARQ-ACK/NACK REs in the uplink transmission, and the UL-SCH data is mapped to REs to rate match around the mapped high priority HARQ-ACK/NACK REs, the mapped low priority HARQ-ACK/NACK REs, and the mapped CSI REs in the uplink transmission At block 2104, the method 2100 may include demapping the mapped REs (e.g., based on a RE mapping scheme at the UE), as discussed above in connection with FIGS. 5-14. In other words, at block 2104, the method 2100 may include demapping the high priority HARQ-ACK/NACK REs, the low priority HARQ-ACK/NACK REs, the CSI REs, and the UL-SCH REs to obtain the high priority HARQ-ACK/NACK information, the low priority HARQ-ACK/NACK information, the CSI, and the UL-SCH data. For example, the demapping circuitry 1942 as shown and described in connection with FIG. 19, or equivalents thereof, may provide a means for demapping the high priority HARQ-ACK/NACK REs, the low priority HARQ-ACK/NACK REs, the CSI REs, and the UL-SCH REs to obtain the high priority HARQ-ACK/NACK information, the low priority HARQ-ACK/NACK information, the CSI, and the UL-SCH data.

Additionally, method 2100 may include decoding (or interpreting) the received and demapped information (e.g., the received and demapped high priority HARQ-ACK/NACK information, the low priority HARQ-ACK/NACK information, the CSI, and the UL-SCH data) as shown in block 2106. For example, the decoding circuitry 1943, as shown and described in connection with FIG. 9, or equivalents thereof, may provide a means for decoding the high priority HARQ-ACK/NACK information, the low priority HARQ-ACK/NACK information, the CSI, and the UL-SCH data.

Of further note, the present disclosure may include the following further aspects of the present disclosure.

Aspect 1: A method of wireless communication at a user equipment (UE) comprising: mapping a high priority hybrid automatic repeat request-acknowledgment/negative acknowledgment (HARQ-ACK/NACK) information to one or more resource elements (REs) in an uplink transmission, and mapping one or more of a low priority HARQ-ACK/NACK information, channel state information (CSI), or uplink-shared channel (UL-SCH) data to REs in the uplink transmission, including mapping to rate match around the mapped one or more high priority HARQ-ACK/NACK REs in the uplink transmission.

Aspect 2: The method of aspect 1, wherein, in response to determining that a size of the low priority HARQ-ACK/NACK information is less than or equal to a predetermined number of bits, the mapping the low priority HARQ-ACK/NACK information includes mapping the low priority HARQ-ACK/NACK information to reserved REs.

Aspect 3: The method of aspect 1 or 2, further comprising: mapping the CSI to CSI REs, including rate matching around the mapped one or more high priority HARQ-ACK/NACK REs and the reserved REs, and mapping the UL-SCH data to UL-SCH REs, including rate matching around the mapped one or more high priority HARQ-ACK/NACK REs and the CSI REs in the uplink transmission prior to mapping the low priority HARQ-ACK/NACK information, including ignoring the reserved REs, wherein mapping the low priority HARQ-ACK/NACK information to the reserved REs includes puncturing the UL-SCH data mapped to one or more of the reserved REs.

Aspect 4: The method of any of aspects 1 through 3, wherein, in response to determining that a size of the low priority HARQ-ACK/NACK information is greater than a predetermined number of bits, the mapping the one or more of the low priority HARQ-ACK/NACK information, the CSI, or the UL-SCH data to REs in the uplink transmission includes: mapping the low priority HARQ-ACK/NACK information to low priority HARQ-ACK/NACK REs, including rate matching around the mapped one or more high priority HARQ-ACK/NACK REs in the uplink transmission, mapping the CSI to CSI REs, including rate matching around the mapped one or more high priority HARQ-ACK/NACK REs and the mapped low priority HARQ-ACK/NACK REs in the uplink transmission, and mapping the UL-SCH data to UL-SCH REs, including rate matching around the mapped one or more high priority HARQ-ACK/NACK REs, the mapped low priority HARQ-ACK/NACK REs, and the mapped CSI REs in the uplink transmission.

Aspect 5: The method of any of aspects 1 through 4, further comprising: padding the low priority HARQ-ACK/NACK information to a predetermined number of bits in response to determining that a size of the low priority HARQ-ACK/NACK information is less than or equal to the predetermined number of bits, encoding the padded low priority HARQ-ACK/NACK information, and mapping the encoded padded low priority HARQ-ACK/NACK information to encoded padded low priority HARQ-ACK/NACK REs, including rate matching around the mapped one or more high priority HARQ-ACK/NACK REs in the uplink transmission.

Aspect 6: The method of aspect 5, further comprising: mapping the CSI to CSI REs, including rate matching around the mapped one or more high priority HARQ-ACK/NACK REs and the mapped encoded padded low priority HARQ-ACK/NACK REs in the uplink transmission, and mapping the UL-SCH data to UL-SCH REs, including rate matching around the mapped one or more high priority HARQ-ACK/NACK REs, the mapped encoded padded low priority HARQ-ACK/NACK REs, and the mapped CSI REs in the uplink transmission.

Aspect 7: The method of any of aspects 1 through 6, wherein in response to determining that the size of the low priority HARQ-ACK/NACK information is greater than a predetermined number of bits, not padding the low priority HARQ-ACK/NACK information, and the mapping the one or more of the low priority HARQ-ACK/NACK information, the CST, or the UL-SCH data to REs in the uplink transmission includes: mapping the low priority HARQ-ACK/NACK information to low priority HARQ-ACK/NACK REs, including rate matching around the mapped one or more high priority HARQ-ACK/NACK REs in the uplink transmission, mapping the CSI to CSI REs, including rate matching around the mapped one or more high priority HARQ-ACK/NACK REs and the mapped low priority HARQ-ACK/NACK REs in the uplink transmission, and mapping the UL-SCH data to UL-SCH REs, including rate matching around the mapped one or more high priority HARQ-ACK/NACK REs, the mapped low priority HARQ-ACK/NACK REs, and the mapped CSI REs in the uplink transmission.

Aspect 8: The method of any of aspects 1 through 7, further comprising: reserving REs for the high priority HARQ-ACK/NACK information in response to determining that a first size of the high priority HARQ-ACK/NACK information is less than or equal to a first predetermined number of bits, padding the low priority HARQ-ACK/NACK information to a second predetermined number of bits in response to determining that a second size of the low priority HARQ-ACK/NACK information is less than the second predetermined number of bits, and not padding the low priority HARQ-ACK/NACK information in response to determining that the second size of the low priority HARQ-ACK/NACK information is greater than or equal to the second predetermined number of bits, and mapping the low priority HARQ-ACK/NACK information to low priority HARQ-ACK/NACK REs, including rate matching around reserved REs for the high priority HARQ-ACK/NACK information in the uplink transmission.

Aspect 9: The method of aspect 8, further comprising: mapping the CSI to CSI REs, including rate matching around the mapped low priority HARQ-ACK/NACK REs and ignoring the reserved REs for the high priority HARQ-ACK/NACK information in the uplink transmission, mapping the UL-SCH data to UL-SCH REs, including rate matching around at least the mapped low priority HARQ-ACK/NACK REs and the mapped CSI REs and ignoring the reserved REs for the high priority HARQ-ACK/NACK information in the uplink transmission, and mapping the high priority HARQ-ACK/NACK information to the reserved REs, including puncturing REs mapped for the CSI and the UL-SCH data.

Aspect 10: The method of aspect 8, further comprising: avoiding reserving REs for the high priority HARQ-ACK/NACK information in response to determining that the first size of the high priority HARQ-ACK/NACK information is greater than the first predetermined number of bits, padding the low priority HARQ-ACK/NACK information to the second predetermined number of bits in response to determining that the second size of the low priority HARQ-ACK/NACK information is less than the second predetermined number of bits, and avoiding padding the low priority HARQ-ACK/NACK information in response to determining that the second size of the low priority HARQ-ACK/NACK information is greater than or equal to the second predetermined number of bits, mapping the high priority HARQ-ACK/NACK information to high priority HARQ-ACK/NACK REs in the uplink transmission, mapping the low priority HARQ-ACK/NACK information to low priority HARQ-ACK/NACK REs, including rate matching around the mapped one or more high priority HARQ-ACK/NACK REs in the uplink transmission, mapping the CSI to CSI REs, including rate matching around the mapped one or more high priority HARQ-ACK/NACK REs and the mapped low priority HARQ-ACK/NACK REs in the uplink transmission, and mapping the UL-SCH data to UL-SCH REs, including rate matching around the mapped one or more high priority HARQ-ACK/NACK REs, the mapped low priority HARQ-ACK/NACK REs, and the mapped CSI REs in the uplink transmission.

Aspect 11: The method of any of aspects 8 through 10, further comprising: setting a beta_offset equal to a quotient of an indicated beta_offset, indicated by received downlink control information (DCI) and a scaling factor, wherein the scaling factor is greater than one when the number of low priority HARQ-ACK/NACK information bits is less than the second predetermined number of bits.

Aspect 12: The method of any of aspects 8 through 10, further comprising: setting a beta_offset equal to an indicated beta_offset, indicated by received downlink control information (DCI) when the number of low priority HARQ-ACK/NACK information bits is greater than or equal to the second predetermined number of bits.

Aspect 13: The method of any of aspects 1 through 12, further comprising: transmitting the high priority uplink transmission, including the HARQ-ACK/NACK information, and the one or more of the low priority HARQ-ACK/NACK information, channel status information (CSI), or uplink-shared channel (UL-SCH) data mapped to high priority HARQ-ACK/NACK resource elements (REs), low priority HARQ-ACK/NACK REs. CSI REs, or UL-SCH REs, respectively, wherein the one or more of the low priority HARQ-ACK/NACK REs, the CSI REs, or the UL-SCH REs are rate matched around the high priority HARQ-ACK/NACK REs.

Aspect 14: A user equipment (UE), comprising: a transceiver, a memory, and a processor communicatively coupled to the transceiver and the memory, wherein the processor and the memory are configured to: map a high priority hybrid automatic repeat request-acknowledgment/negative acknowledgment (HARQ-ACK/NACK) information to one or more resource elements (REs) in an uplink transmission, and map one or more of a low priority HARQ-ACK/NACK information, channel state information (CSI), or uplink-shared channel (UL-SCH) data to REs in the uplink transmission, including mapping to rate match around the mapped one or more high priority HARQ-ACK/NACK REs in the uplink transmission.

Aspect 15: The UE of aspect 14, wherein, in response to determining that a size of the low priority HARQ-ACK/NACK information is less than or equal to a predetermined number of bits, the processor and the memory are further configured to map the low priority HARQ-ACK/NACK information by: mapping the low priority HARQ-ACK/NACK information to reserved REs.

Aspect 16: The UE of aspect 14 or 15, wherein the processor and the memory are further configured to: map the CSI to CSI REs, including rate matching around the mapped one or more high priority HARQ-ACK/NACK REs and the reserved REs. and map the UL-SCH data to REs, including rate matching around the mapped one or more high priority HARQ-ACK/NACK REs and the CSI REs in the uplink transmission prior to mapping the low priority HARQ-ACK/NACK information, including ignoring the reserved REs, wherein the mapping the low priority HARQ-ACK/NACK information to the reserved REs includes puncturing the UL-SCH data mapped to one or more of the reserved REs.

Aspect 17: The UE of any of aspects 14 through 16, wherein, in response to determining that a size of the low priority HARQ-ACK/NACK information is greater than a predetermined number of bits, the processor and the memory are further configured to: map the one or more of the low priority HARQ-ACK/NACK information, the CSI, or the UL-SCH data to REs in the uplink transmission by: mapping the low priority HARQ-ACK/NACK information to low priority HARQ-ACK/NACK REs, including rate matching around the mapped one or more high priority HARQ-ACK/NACK REs in the uplink transmission, mapping the CSI to CSI REs, including rate matching around the mapped one or more high priority HARQ-ACK/NACK REs and the mapped low priority HARQ-ACK/NACK REs in the uplink transmission, and mapping the UL-SCH data to UL-SCH REs, including rate matching around the mapped one or more high priority HARQ-ACK/NACK REs, the mapped low priority HARQ-ACK/NACK REs, and the mapped CSI REs in the uplink transmission.

Aspect 18: The UE of any of aspects 14 through 17, wherein the processor and the memory are further configured to: pad the low priority HARQ-ACK/NACK information to a predetermined number of bits in response to determining that a size of the low priority HARQ-ACK/NACK information is less than or equal to the predetermined number of bits, encode the padded low priority HARQ-ACK/NACK information, and map the encoded padded low priority HARQ-ACK/NACK information to encoded padded low priority HARQ-ACK/NACK REs, including rate matching around the mapped one or more high priority HARQ-ACK/NACK REs in the uplink transmission.

Aspect 19: The UE of aspect 18, wherein the processor and the memory are further configured to: map the CSI to REs, including rate matching around the mapped one or more high priority HARQ-ACK/NACK REs and the mapped encoded padded low priority HARQ-ACK/NACK REs in the uplink transmission, and map the UL-SCH data to REs, including rate matching around the mapped one or more high priority HARQ-ACK/NACK REs, the mapped encoded padded low priority HARQ-ACK/NACK REs, and the mapped CSI REs in the uplink transmission.

Aspect 20: The UE of any of aspects 14 through 19, wherein, in response to determining that a size of the low priority HARQ-ACK/NACK information is greater than a predetermined number of bits, the processor and the memory are further configured to: not pad the low priority HARQ-ACK/NACK information; and map the one or more of the low priority HARQ-ACK/NACK information, the CSI, or the UL-SCH data to REs in the uplink transmission by: mapping the low priority HARQ-ACK/NACK information to low priority HARQ-ACK/NACK REs, including rate matching around the mapped one or more high priority HARQ-ACK/NACK REs in the uplink transmission, mapping the CSI to CSI REs, including rate matching around the mapped one or more high priority HARQ-ACK/NACK REs and the mapped low priority HARQ-ACK/NACK REs in the uplink transmission, and mapping the UL-SCH data to UL-SCH REs, including rate matching around the mapped one or more high priority HARQ-ACK/NACK REs, the mapped low priority HARQ-ACK/NACK REs, and the mapped CSI REs in the uplink transmission.

Aspect 21: The UE of any of aspects 14 through 20, wherein the processor and the memory are further configured to: reserve REs for the high priority HARQ-ACK/NACK information in response to determining that a first size of the high priority HARQ-ACK/NACK information is less than or equal to a first predetermined number of bits, pad the low priority HARQ-ACK/NACK information to a second predetermined number of bits in response to determining that a second size of the low priority HARQ-ACK/NACK information is less than the second predetermined number of bits, and not pad the low priority HARQ-ACK/NACK information in response to determining that the second size of the low priority HARQ-ACK/NACK information is greater than or equal to the second predetermined number of bits, and map the low priority HARQ-ACK/NACK information to low priority HARQ-ACK/NACK REs, including rate matching around reserved REs for the high priority HARQ-ACK/NACK information in the uplink transmission.

Aspect 22: The UE of aspect 21, wherein the processor and the memory are further configured to: map the CSI to REs, including rate matching around the mapped low priority HARQ-ACK/NACK REs and ignoring the reserved REs for the high priority HARQ-ACK/NACK information in the uplink transmission, map the UL-SCH data to REs, including rate matching around at least the mapped low priority HARQ-ACK/NACK REs. and the mapped CSI REs and ignoring the reserved REs for the high priority HARQ-ACK/NACK information in the uplink transmission, and map the high priority HARQ-ACK/NACK information to the reserved REs, including puncturing one or more CSI REs, UL-SCH REs, or both CSI REs and UL-SCH REs.

Aspect 23: The UE of aspect 21, wherein the processor and the memory are further configured to: avoid reserving REs for the high priority HARQ-ACK/NACK information in response to determining that the first size of the high priority HARQ-ACK/NACK information is greater than the first predetermined number of bits, pad the low priority HARQ-ACK/NACK information with the second predetermined number of bits in response to determining that the second size of the low priority HARQ-ACK/NACK information is less than the second predetermined number of bits, and avoid padding the low priority HARQ-ACK/NACK information in response to determining that the second size of the low priority HARQ-ACK/NACK information is greater than or equal to the second predetermined number of bits; map the high priority HARQ-ACK/NACK information to high priority HARQ-ACK/NACK REs in the uplink transmission, map the low priority HARQ-ACK/NACK information to low priority HARQ-ACK/NACK REs, including rate matching around the mapped one or more high priority HARQ-ACK/NACK REs in the uplink transmission, map the CSI to REs, including rate matching around the mapped one or more high priority HARQ-ACK/NACK RE % and the mapped low priority HARQ-ACK/NACK REs in the uplink transmission, and map the UL-SCH data to REs, including rate matching around the mapped one or more high priority HARQ-ACK/NACK REs, the mapped low priority HARQ-ACK/NACK REs, and the mapped CSI REs in the uplink transmission.

Aspect 24: The UE of any of aspects 14 through 23, wherein the processor and memory are further configured to: set a beta_offset equal to a quotient of an indicated beta_offset, indicated by received downlink control information (DCI) and a scaling factor, wherein the scaling factor is greater than one when the number of low priority HARQ-ACK/NACK information bits is less than the second predetermined number of bits.

Aspect 25: The UE of any of aspects 14 through 23, wherein the processor and memory are further configured to: set a beta_offset equal to an indicated beta_offset, indicated by received downlink control information (DCI) when the number of low priority HARQ-ACK/NACK information bits is greater than or equal to the second predetermined number of bits.

Aspect 26: The UE of any of aspects 14 through 25, wherein the processor and memory are further configured to: transmit the high priority uplink transmission, including the HARQ-ACK/NACK information, and the one or more of the low priority HARQ-ACK/NACK information, channel status information (CSI), or uplink-shared channel (UL-SCH) data mapped to high priority HARQ-ACK/NACK resource elements (REs), low priority HARQ-ACK/NACK REs, CSI REs, or UL-SCH REs, respectively, wherein the one or more of the low priority HARQ-ACK/NACK REs, the CSI REs, or the UL-SCH REs are rate matched around the high priority HARQ-ACK/NACK REs.

Aspect 27: A method of communication at a network entity, comprising: receiving, from a user equipment (UE), an uplink transmission, including high priority hybrid automatic repeat request-acknowledgment/negative acknowledgment (HARQ-ACK/NACK) information, low priority HARQ-ACK/NACK information, channel status information (CSI), and uplink-shared channel (UL-SCH) data mapped to high priority HARQ-ACK/NACK resource elements (REs), low priority HARQ-ACK/NACK REs, CSI REs, and UL-SCH REs, respectively, wherein the low priority HARQ-ACK/NACK REs, the CSI REs, and the UL-SCH REs are rate matched around the high priority HARQ-ACK/NACK REs; demapping the high priority HARQ-ACK/NACK REs, the low priority HARQ-ACK/NACK REs, the CSI REs. and the UL-SCH REs to obtain the high priority HARQ-ACK/NACK information, the low priority HARQ-ACK/NACK information, the CSI, and the UL-SCH data, and decoding the high priority HARQ-ACK/NACK information, the low priority HARQ-ACK/NACK information, the CSI, and the UL-SCH data.

Aspect 28: The method of aspect 27, wherein in response to a size of the low priority HARQ-ACK/NACK information being less than or equal to a predetermined number of bits, the low priority HARQ-ACK/NACK information is mapped to reserved REs.

Aspect 29: The method of aspect 27 or 28, wherein in response to a size of the low priority HARQ-ACK/NACK information being greater than a predetermined number of bits: the low priority HARQ-ACK/NACK information is mapped to REs to rate match around the mapped one or more high priority HARQ-ACK/NACK REs in the uplink transmission, the CSI is mapped to REs to rate matched around the mapped one or more high priority HARQ-ACK/NACK REs and the mapped low priority HARQ-ACK/NACK REs in the uplink transmission, and the UL-SCH data is mapped to REs to rate match around the mapped high priority HARQ-ACK/NACK REs, the mapped low priority HARQ-ACK/NACK REs, and the mapped CSI REs in the uplink transmission.

Aspect 30: A network entity, comprising: a transceiver, a memory, and a processor communicatively coupled to the transceiver and the memory, wherein the processor and the memory are configured to: receive, from a user equipment (UE), an uplink transmission, including high priority hybrid automatic repeat request-acknowledgment/negative acknowledgment (HARQ-ACK/NACK) information, low priority HARQ-ACK/NACK information, channel status information (CSI), and uplink-shared channel (UL-SCH) data mapped to high priority HARQ-ACK/NACK resource elements (REs), low priority HARQ-ACK/NACK REs, CSI REs, and UL-SCH REs, respectively, wherein the low priority HARQ-ACK/NACK REs, the CSI REs, and the UL-SCH REs are rate matched around the high priority HARQ-ACK/NACK REs; demap the high priority HARQ-ACK/NACK REs, the low priority HARQ-ACK/NACK REs, the CSI REs, and the UL-SCH REs to obtain the high priority HARQ-ACK/NACK information, the low priority HARQ-ACK/NACK information, the CSI, and the UL-SCH data, and decode the high priority HARQ-ACK/NACK information, the low priority HARQ-ACK/NACK information, the CSI, and the UL-SCH data.

Aspect 31: The network entity of aspect 30, wherein, in response to a size of the low priority HARQ-ACK/NACK information being less than or equal to a predetermined number of bits, the processor and the memory are further configured to: demap the low priority HARQ-ACK/NACK information from reserved REs.

Aspect 32: The network entity of aspect 30 or 31, wherein, wherein in response to a size of the low priority HARQ-ACK/NACK information being greater than a predetermined number of bits, the processor and the memory are further configured to: demap the low priority HARQ-ACK/NACK information from REs that were rate matched around the mapped one or more high priority HARQ-ACK/NACK REs in the uplink transmission, demap the CSI from REs that were rate matched around the mapped one or more high priority HARQ-ACK/NACK REs and the mapped low priority HARQ-ACK/NACK REs in the uplink transmission, and demap the UL-SCH data from REs that were rate match around the mapped high priority HARQ-ACK/NACK REs, the mapped low priority HARQ-ACK/NACK REs, and the mapped CSI REs in the uplink transmission.

Aspect 33: An apparatus configured for communication comprising at least one means for performing a method of any one of aspects 1 through 13 or 27 through 29.

Aspect 32: A non-transitory computer-readable medium storing computer-executable code, comprising code for causing an apparatus to perform a method of any one of aspects 1 through 13 or 27 through 29.

Several aspects of a communication network, including but not limited to a wireless communication network, have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB). Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B. and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may encompass a wide variety of actions. For example, "determining" may include calculating, computing, processing, deriving, investigating, looking up (e.g., looking up in a table, a database, or another data structure), ascertaining, resolving, selecting, choosing, establishing, receiving (e.g., receiving information), accessing (e.g., accessing data in a memory), and the like.

One or more of the components, steps, features and/or functions illustrated in FIGS. 1-21 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in any of FIGS. 1-21 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example. "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication at a user equipment (UE), comprising:
    obtaining high priority (HP) hybrid automatic repeat request-acknowledgment/negative acknowledgment (HARQ-ACK/NACK) information, low priority (LP) HARQ-ACK/NACK information, channel state information (CSI) comprising LP CSI part 1 and LP CSI part 2, and uplink-shared channel (UL-SCH) data, wherein the UE has a maximum of four uplink control information (UCI) encoders;
    dropping the LP CSI part 2 in response to the CSI comprising the LP CSI part 1 and the LP CSI part 2;
    mapping the HP HARQ-ACK/NACK information, the LP HARQ-ACK/NACK information, the LP CSI part 1, and the UL-SCH data to one or more of each of: HP HARQ-ACK/NACK resource elements (REs), LP HARQ-ACK/NACK REs, LP CSI part 1 REs, and UL-SCH REs, respectively; and
    rate matching the LP HARQ-ACK/NACK REs, the LP CSI part 1 REs, and the UL-SCH REs around the HP HARQ-ACK/NACK REs the HP HARK-ACK/NACK REs, the LP HARQ-ACK/NACK REs, the LP CSI part 1 REs, and the UL-SCH REs comprising resources in an uplink transmission on a physical uplink shared channel (PUSCH).

2. The method of claim 1, wherein, in response to determining that a size of the LP HARQ-ACK/NACK information is less than or equal to a predetermined number of bits, the mapping the LP HARQ-ACK/NACK information further includes mapping the LP HARQ-ACK/NACK information to one or more reserved REs.

3. The method of claim 2, wherein:
    mapping the LP CSI part 1 to the LP CSI part 1 REs further includes rate matching the LP CSI part 1 REs around the HP HARQ-ACK/NACK REs and the one or more reserved REs; and
    mapping the UL-SCH data to the UL-SCH REs further includes rate matching the UL-SCH REs around the HP HARQ-ACK/NACK RES and the LP CSI part 1 REs in the uplink transmission prior to mapping the LP HARQ-ACK/NACK information, including ignoring the one or more reserved REs,
    wherein mapping the LP HARQ-ACK/NACK information to the one or more reserved REs includes puncturing the LP HARQ-ACK/NACK information to the one or more reserved REs.

4. The method of claim 1, wherein, in response to determining that a size of the LP HARQ-ACK/NACK information is greater than a predetermined number of bits:
    the mapping the LP HARQ-ACK/NACK information to the LP HARQ-ACK/NACK REs further includes rate matching the LP HARQ-ACK/NACK REs around the HP HARQ-ACK/NACK REs in the uplink transmission;
    the mapping the LP CSI part 1 to the LP CSI part 1 REs further includes rate matching the LP CSI part 1 REs around the HP HARQ-ACK/NACK REs and the LP HARQ-ACK/NACK REs in the uplink transmission; and
    the mapping the UL-SCH data to the UL-SCH REs further includes rate matching the UL-SCH REs around the HP HARQ-ACK/NACK REs, the LP HARQ-ACK/NACK REs, and the LP CSI part 1 REs in the uplink transmission.

5. The method of claim 1, further comprising:
    padding the LP HARQ-ACK/NACK information to a predetermined number of bits in response to determining that a size of the LP HARQ-ACK/NACK information is less than or equal to the predetermined number of bits;
    encoding the padded LP HARQ-ACK/NACK information; and
    mapping the encoded padded LP HARQ-ACK/NACK information to encoded padded LP HARQ-ACK/

NACK REs, including rate matching the encoded padded LP HARQ-ACK/NACK REs around the HP HARQ-ACK/NACK REs in the uplink transmission.

6. The method of claim 5, wherein:
mapping the LP CSI part 1 to the LP CSI part 1 REs further includes rate matching the LP CSI part 1 REs around the HP HARQ-ACK/NACK REs and the encoded padded LP HARQ-ACK/NACK REs in the uplink transmission; and
mapping the UL-SCH data to the UL-SCH REs further includes rate matching the UL-SCH REs around the HP HARQ-ACK/NACK RES, the encoded padded LP HARQ-ACK/NACK REs, and the LP CSI part 1 REs in the uplink transmission.

7. The method of claim 1, wherein in response to determining that a size of the LP HARQ-ACK/NACK information is greater than a predetermined number of bits, the method further includes:
avoiding padding the LP HARQ-ACK/NACK information, wherein:
the mapping the LP HARQ-ACK/NACK information to the LP HARQ-ACK/NACK REs further includes rate matching the LP HARQ-ACK/NACK REs around the HP HARQ-ACK/NACK REs in the uplink transmission;
the mapping the LP CSI part 1 to the LP CSI part 1 REs further includes rate matching the LP CSI part 1 REs around the HP HARQ-ACK/NACK REs and the LP HARQ-ACK/NACK REs in the uplink transmission; and
the mapping the UL-SCH data to the UL-SCH REs further includes rate matching the UL-SCH REs around the HP HARQ-ACK/NACK REs, the LP HARQ-ACK/NACK REs, and the LP CSI part 1 REs in the uplink transmission.

8. The method of claim 1, further comprising:
reserving one or more reserved REs for the HP HARQ-ACK/NACK information in response to determining that a first size of the HP HARQ-ACK/NACK information is less than or equal to a first predetermined number of bits;
padding the LP HARQ-ACK/NACK information to a second predetermined number of bits in response to determining that a second size of the LP HARQ-ACK/NACK information is less than the second predetermined number of bits, and avoiding padding the LP HARQ-ACK/NACK information in response to determining that the second size of the LP HARQ-ACK/NACK information is greater than or equal to the second predetermined number of bits; and
the mapping the LP HARQ-ACK/NACK information to low priority the LP HARQ-ACK/NACK REs further includes rate matching the LP HARQ-ACK/NACK REs around the one or more reserved REs for the HP HARQ-ACK/NACK information in the uplink transmission.

9. The method of claim 8, wherein:
mapping the LP CSI part 1 to the LP CSI part 1 REs further includes rate matching the LP CSI part 1 REs around the LP HARQ-ACK/NACK RES and ignoring the one or more reserved REs for the HP HARQ-ACK/NACK information in the uplink transmission;
mapping the UL-SCH data to the UL-SCH REs further includes rate matching the UL-SCH REs around at least the LP HARQ-ACK/NACK REs, and the LP CSI part 1 REs, and ignoring the one or more reserved REs for the HP HARQ-ACK/NACK information in the uplink transmission; and
mapping the HP HARQ-ACK/NACK information to the one or more reserved REs further includes puncturing the LP CSI part 1 REs, the UL-SCH REs, or both the LP CSI part 1 REs and the UL-SCH REs.

10. The method of claim 8, further comprising:
avoiding reserving the one or more reserved REs for the HP HARQ-ACK/NACK information in response to determining that the first size of the HP HARQ-ACK/NACK information is greater than the first predetermined number of bits;
padding the LP HARQ-ACK/NACK information to the second predetermined number of bits in response to determining that the second size of the LP HARQ-ACK/NACK information is less than the second predetermined number of bits, and avoiding the padding the LP HARQ-ACK/NACK information in response to determining that the second size of the LP HARQ-ACK/NACK information is greater than or equal to the second predetermined number of bits, wherein:
mapping the LP HARQ-ACK/NACK information to the LP HARQ-ACK/NACK REs further includes rate matching the LP HARQ-ACK/NACK RES around the HP HARQ-ACK/NACK REs in the uplink transmission,
mapping the LP CSI part 1 to the LP CSI part 1 REs further includes rate matching the LP CSI part 1 REs around the HP HARQ-ACK/NACK REs and the LP HARQ-ACK/NACK REs in the uplink transmission, and
mapping the UL-SCH data to the UL-SCH REs further includes rate matching the UL-SCH REs around the HP HARQ-ACK/NACK REs, the LP HARQ-ACK/ NACK REs, and the LP CSI part 1 REs in the uplink transmission.

11. The method of claim 8, further comprising:
setting a beta_offset equal to a quotient of an indicated beta_offset, indicated by received downlink control information (DCI) and a scaling factor, wherein the scaling factor is greater than one in response to the second size of the LP HARQ-ACK/NACK information being less than the second predetermined number of bits.

12. The method of claim 1, further comprising:
transmitting the uplink transmission, including the HP HARQ-ACK/NACK information, the LP HARQ-ACK/NACK information, the LP CSI part 1, and the UL-SCH data to the HP HARQ-ACK/NACK REs, the LP HARQ-ACK/NACK REs, the LP CSI part 1 REs, and the UL-SCH REs, respectively, wherein the LP HARQ-ACK/NACK REs, the LP CSI part 1 REs, and the UL-SCH REs are rate matched around the HP HARQ-ACK/NACK REs.

13. A user equipment (UE), comprising:
a maximum of four uplink control information (UCI) encoders;
one or more memories; and
one or more processors coupled to the one or more memories, wherein the one or more processors are configured to:
obtain high priority (HP) hybrid automatic repeat request-acknowledgment/negative acknowledgment (HARQ-ACK/NACK) information, low priority (LP) HARQ-ACK/NACK information, channel state information (CSI) comprising LP CSI part 1 and LP CSI part 2, and uplink-shared channel (UL-SCH) data, wherein the UE has the maximum of four UCI encoders;
drop the LP CSI part 2 in response to the CSI comprising the LP CSI part 1 and the LP CSI part 2;
map the HP HARQ-ACK/NACK information, the LP HARQ-ACK/NACK information, the LP CSI part 1, and the UL-SCH data to one or more of each of: HP HARQ-ACK/NACK resource elements (REs), LP HARQ-ACK/NACK REs, LP CSI part 1 REs, and UL-SCH REs, respectively; and
rate match the LP HARQ-ACK/NACK REs, the LP CSI part 1 REs, and the UL-SCH REs around the HP HARQ-ACK/NACK REs, the LP HARQ-ACK/NACK REs, the LP CSI part 1 REs, and the UL-SCH REs comprising resources in an uplink transmission on a physical uplink shared channel (PUSCH).

14. The UE of claim 13, wherein, in response to determining that a size of the LP HARQ-ACK/NACK information is less than or equal to a predetermined number of bits, the one or more processors are further configured to map the LP HARQ-ACK/NACK information to one or more reserved REs.

15. The UE of claim 14, wherein the one or more processors are further configured to:
map the LP CSI part 1 to the LP CSI part 1 REs by being further configured to rate match the LP CSI part 1 REs around the HP HARQ-ACK/NACK REs and the one or more reserved REs; and to:
map the UL-SCH data to the UL-SCH REs by being further configured to rate match the UL-SCH REs around the HP HARQ-ACK/NACK REs and the LP CSI part 1 REs in the uplink transmission prior to mapping the LP HARQ-ACK/NACK information, including ignoring the one or more reserved REs,
wherein the mapping the LP HARQ-ACK/NACK information to the one or more reserved REs includes puncturing the LP HARQ-ACK/NACK information to the one or more reserved REs.

16. The UE of claim 13, wherein, in response to determining that a size of the LP HARQ-ACK/NACK information is greater than a predetermined number of bits, the one or more processors are further configured to:
map the LP HARQ-ACK/NACK information to the LP HARQ-ACK/NACK REs by being further configured to rate match the LP HARQ-ACK/NACK RES around the HP HARQ-ACK/NACK REs in the uplink transmission;
map the LP CSI part 1 to the LP CSI part 1 REs by being further configured to include rate match the LP CSI part 1 REs around the HP HARQ-ACK/NACK REs and the LP HARQ-ACK/NACK REs in the uplink transmission; and
map the UL-SCH data to the UL-SCH REs by being further configured to rate match the UL-SCH REs around the HP HARQ-ACK/NACK REs, the LP HARQ-ACK/NACK REs, and the LP CSI part 1 REs in the uplink transmission.

17. The UE of claim 13, wherein the one or more processors are further configured to:
pad the LP HARQ-ACK/NACK information to a predetermined number of bits in response to determining that a size of the LP HARQ-ACK/NACK information is less than or equal to the predetermined number of bits;
encode the padded LP HARQ-ACK/NACK information;
map the encoded padded LP HARQ-ACK/NACK information to encoded padded LP HARQ-ACK/NACK REs; and
rate match encoded padded LP HARQ-ACK/NACK REs around the HP HARQ-ACK/NACK REs in the uplink transmission.

18. The UE of claim 17, wherein the one or more processors are further configured to:
map the LP CSI part 1 to the LP CSI part 1 by being further configured to rate match the LP CSI part 1 around the HP HARQ-ACK/NACK REs and the encoded padded LP HARQ-ACK/NACK REs in the uplink transmission; and
map the UL-SCH data to the UL-SCH REs by being further configured to rate match the UL-SCH REs around the HP HARQ-ACK/NACK REs, the encoded padded LP HARQ-ACK/NACK REs, and the LP CSI part 1 REs in the uplink transmission.

19. The UE of claim 13, wherein, in response to determining that a size of the LP HARQ-ACK/NACK information is greater than a predetermined number of bits, the one or more processors are further configured to:
avoid padding the LP HARQ-ACK/NACK information;
map the LP HARQ-ACK/NACK information to the LP HARQ-ACK/NACK REs by being further configured to rate match the LP HARQ-ACK/NACK REs around the HP HARQ-ACK/NACK REs in the uplink transmission;
map the LP CSI part 1 to the LP CSI part 1 REs by being further configured to rate match the LP CSI part 1 REs around the HP HARQ-ACK/NACK REs and the LP HARQ-ACK/NACK REs in the uplink transmission; and
map the UL-SCH data to the UL-SCH REs by being further configured to rate match the UL-SCH REs around the HP HARQ-ACK/NACK REs, the LP HARQ-ACK/NACK REs, and the LP CSI part 1 REs in the uplink transmission.

20. The UE of claim 13, wherein the one or more processors are further configured to:
reserve one or more reserved REs for the HP HARQ-ACK/NACK information in response to determining that a first size of the HP HARQ-ACK/NACK information is less than or equal to a first predetermined number of bits;
pad the LP HARQ-ACK/NACK information to a second predetermined number of bits in response to determining that a second size of the LP HARQ-ACK/NACK information is less than the second predetermined number of bits, and avoid padding the LP HARQ-ACK/NACK information in response to determining that the second size of the LP HARQ-ACK/NACK information is greater than or equal to the second predetermined number of bits; and
map the LP HARQ-ACK/NACK information to the LP HARQ-ACK/NACK REs by being further configured to rate match the LP HARQ-ACK/NACK REs around the one or more reserved REs for the HP HARQ-ACK/NACK information in the uplink transmission.

21. The UE of claim 20, wherein the one or more processors are further configured to:
map the LP CSI part 1 to the LP CSI part 1 REs by being further configured to rate match the LP CSI part 1 REs around the LP HARQ-ACK/NACK REs and ignore the one or more reserved REs for the HP HARQ-ACK/NACK information in the uplink transmission;

map the UL-SCH data to the UL-SCH REs by being further configured to rate match the UL-SCH REs around at least the LP HARQ-ACK/NACK REs, and the LP CSI part 1 REs, and ignore the one or more reserved REs for the HP HARQ-ACK/NACK information in the uplink transmission; and map the HP HARQ-ACK/NACK information to the one or more reserved REs by being further configured to puncture the LP CSI part 1 REs, the UL-SCH REs, or both the LP CSI part 1 REs and the UL-SCH REs.

22. The UE of claim 20, wherein the one or more processors are further configured to:

avoid reserving the one or more reserved REs for the HP HARQ-ACK/NACK information in response to determining that the first size of the HP HARQ-ACK/NACK information is greater than the first predetermined number of bits;

pad the LP HARQ-ACK/NACK information with the second predetermined number of bits in response to determining that the second size of the LP HARQ-ACK/NACK information is less than the second predetermined number of bits, and avoid the padding the LP HARQ-ACK/NACK information in response to determining that the second size of the LP HARQ-ACK/NACK information is greater than or equal to the second predetermined number of bits;

map the LP HARQ-ACK/NACK information to the LP HARQ-ACK/NACK REs by being further configured to rate match the LP HARQ-ACK/NACK REs around the HP HARQ-ACK/NACK REs in the uplink transmission;

map the LP CSI part 1 to the LP CSI part 1 REs by being further configured to rate match the LP CSI part 1 REs around the HP HARQ-ACK/NACK REs and the LP HARQ-ACK/NACK REs in the uplink transmission; and map the UL-SCH data to the UL-SCH REs by being further configured to rate match the LP CSI part 1 REs around the HP HARQ-ACK/NACK REs, the LP HARQ-ACK/NACK REs, and the LP CSI part 1 REs in the uplink transmission.

23. The UE of claim 20, wherein the one or more processors are further configured to:

set a beta_offset equal to a quotient of an indicated beta_offset, indicated by received downlink control information (DCI) and a scaling factor, wherein the scaling factor is greater than one in response to the second size of the LP HARQ-ACK/NACK information being less than the second predetermined number of bits.

24. The UE of claim 13, wherein the one or more processors are further configured to:

transmit the uplink transmission, including the HP HARQ-ACK/NACK information, the LP HARQ-ACK/NACK information, the LP CSI part 1, and the UL-SCH data to the HP HARQ-ACK/NACK REs, the LP HARQ-ACK/NACK REs, the LP CSI part 1 REs, and the UL-SCH REs, respectively, wherein the LP HARQ-ACK/NACK REs, the LP CSI part 1 REs, and the UL-SCH REs are rate matched around the HP HARQ-ACK/NACK REs.

25. A method of communication at a network entity, comprising:

receiving, in an uplink transmission of a physical uplink shared channel (PUSCH), high priority (HP) hybrid automatic repeat request-acknowledgment/negative acknowledgment (HARQ-ACK/NACK) information, low priority (LP) HARQ-ACK/NACK information, channel state information (CSI) comprising LP CSI part 1 with LP CSI part 2 having been dropped, and uplink-shared channel (UL-SCH) data to each of one or more HP HARQ-ACK/NACK resource elements (REs), LP HARQ-ACK/NACK REs, LP CSI part 1 REs, and UL-SCH REs, respectively, wherein the LP HARQ-ACK/NACK REs, the LP CSI part 1 REs, and the UL-SCH REs are rate matched around the HP HARQ-ACK/NACK RES;

demapping the HP HARQ-ACK/NACK REs, the LP HARQ-ACK/NACK REs, the LP CSI part 1 REs, and the UL-SCH REs to obtain the HP HARQ-ACK/NACK information, the LP HARQ-ACK/NACK information, the LP CSI part 1, and the UL-SCH data; and decoding, using a maximum of four respective uplink control information (UCI) decoders, the HP HARQ-ACK/NACK information, the LP HARQ-ACK/NACK information, the LP CSI part 1, and the UL-SCH data.

26. The method of claim 25, wherein in response to a size of the LP HARQ-ACK/NACK information being less than or equal to a predetermined number of bits, the LP HARQ-ACK/NACK information is to one or more reserved REs.

27. The method of claim 25, wherein in response to a size of the LP HARQ-ACK/NACK information being greater than a predetermined number of bits:

the LP HARQ-ACK/NACK information is to the LP HARQ-ACK/NACK REs and the LP HARQ-ACK/NACK REs are rate matched around the HP HARQ-ACK/NACK REs in the uplink transmission;

the LP CSI part 1 is to the LP CSI part 1 REs and the LP CSI part 1 REs are rate matched around the HP HARQ-ACK/NACK REs and the LP HARQ-ACK/NACK REs in the uplink transmission; and the UL-SCH data is to the UL-SCH REs and the UL-SCH REs are rate matched around the HP HARQ-ACK/NACK REs, the LP HARQ-ACK/NACK REs, and the LP CSI part 1 REs in the uplink transmission.

28. A network entity, comprising:

one or more uplink control information (UCI) decoders;

one or more memories; and one or more processors coupled to the one or more memories, wherein the one or more processors are configured to:

receive, in an uplink transmission of a physical uplink shared channel (PUSCH), high priority (HP) hybrid automatic repeat request-acknowledgment/negative acknowledgment (HARQ-ACK/NACK) information, low priority (LP) HARQ-ACK/NACK information, channel state information (CSI) comprising LP CSI part 1 with LP CSI part 2 having been dropped, and uplink-shared channel (UL-SCH) data to each or one or more HP HARQ-ACK/NACK resource elements (REs), LP HARQ-ACK/NACK REs, LP CSI part 1 REs, and UL-SCH REs, respectively, wherein the LP HARQ-ACK/NACK REs, the LP CSI part 1 REs, and the UL-SCH REs are rate matched around the HP HARQ-ACK/NACK RES;

demap the HP HARQ-ACK/NACK REs, the LP HARQ-ACK/NACK REs, the LP CSI part 1 REs, and the UL-SCH REs to obtain the HP HARQ-ACK/NACK information, the LP HARQ-ACK/NACK information, the LP CSI part 1, and the UL-SCH data; and decode, using a maximum of four respective uplink control information (UCI) decoders of the one or more UCI decoders, the HP HARQ-ACK/NACK information, the LP HARQ-ACK/NACK information, the LP CSI part 1, and the UL-SCH data.

29. The network entity of claim 28, wherein, in response to a size of the LP HARQ-ACK/NACK information being less than or equal to a predetermined number of bits, the one or more processors are further configured to:
  demap the LP HARQ-ACK/NACK information from one or more reserved REs.

30. The network entity of claim 28, wherein in response to a size of the LP HARQ-ACK/NACK information being greater than a predetermined number of bits, the one or more processors are further configured to:
  demap the LP HARQ-ACK/NACK information from the LP HARQ-ACK/NACK REs that were rate matched around the HP HARQ-ACK/NACK REs in the uplink transmission;
  demap the LP CSI part 1 from the LP CSI part 1 REs that were rate matched around the HP HARQ-ACK/NACK REs and the LP HARQ-ACK/NACK REs in the uplink transmission; and
  demap the UL-SCH data from the UL-SCH REs that were rate match around the HP HARQ-ACK/NACK REs, the LP HARQ-ACK/NACK REs, and the LP CSI part 1 REs in the uplink transmission.

* * * * *